(12) United States Patent
Russell et al.

(10) Patent No.: US 9,994,379 B2
(45) Date of Patent: Jun. 12, 2018

(54) CONTAINER CLOSURE

(71) Applicant: Berry Plastics Corporation, Evansville, IN (US)

(72) Inventors: Mark N Russell, Boonville, IN (US); Charles E Luker, Evansville, IN (US)

(73) Assignee: Berry Plastics Corporation, Evansville, IN (US)

(*) Notice: Subject to any disclaimer, the term of this patent is extended or adjusted under 35 U.S.C. 154(b) by 109 days.

(21) Appl. No.: 15/144,057

(22) Filed: May 2, 2016

(65) Prior Publication Data

US 2016/0318686 A1 Nov. 3, 2016

Related U.S. Application Data

(60) Provisional application No. 62/154,995, filed on Apr. 30, 2015.

(51) Int. Cl.
| | | |
|---|---|---|
| *B65B 7/28* | (2006.01) |
| *B65D 79/00* | (2006.01) |
| *B65D 1/02* | (2006.01) |
| *B65D 41/04* | (2006.01) |
| *B65B 55/02* | (2006.01) |
| *B29C 43/14* | (2006.01) |
| *B65D 51/14* | (2006.01) |
| *B29K 23/00* | (2006.01) |
| *B29K 21/00* | (2006.01) |
| *B29L 31/56* | (2006.01) |

(52) U.S. Cl.
CPC .......... *B65D 79/005* (2013.01); *B29C 43/146* (2013.01); *B65B 7/2835* (2013.01); *B65B 55/02* (2013.01); *B65D 1/0246* (2013.01); *B65D 41/0442* (2013.01); *B65D 51/145* (2013.01); *B29C 2043/147* (2013.01); *B29K 2021/00* (2013.01); *B29K 2023/12* (2013.01); *B29L 2031/565* (2013.01); *B65B 2220/24* (2013.01)

(58) Field of Classification Search
CPC ............... B65D 79/005; B65D 51/145; B65D 41/0442; B65D 1/0246; B29C 43/146; B29C 2043/147; B29K 2021/00; B29K 2023/12; B29L 2031/565; B65B 55/02; B65B 7/2835; B65B 2220/24
USPC .............. 220/254.1-254.9, 327; 215/44, 329
See application file for complete search history.

(56) References Cited

U.S. PATENT DOCUMENTS

| | | |
|---|---|---|
| 87,274 A | 2/1869 | Mason |
| 1,172,483 A | 2/1916 | Rike et al. |
| 2,816,697 A | 12/1957 | Amberg |

(Continued)

FOREIGN PATENT DOCUMENTS

| | | |
|---|---|---|
| WO | 2010045699 | 4/2010 |
| WO | 2012075556 | 6/2012 |

OTHER PUBLICATIONS

Canning Lids 101, available from https://www.freshpreserving.com/canning-lids-101.html, retrieved on Jan. 31, 2017, 2 pages.

(Continued)

*Primary Examiner* — Kareen Thomas
(74) *Attorney, Agent, or Firm* — Barnes & Thornburg LLP

(57) ABSTRACT

A closure for mounting on top of bottles and other containers includes a floating lid and a lid-retainer ring. The closure is configured to withstand a high pressure and high temperature sterilization process known as retort.

11 Claims, 16 Drawing Sheets

(56) References Cited

U.S. PATENT DOCUMENTS

| | | | |
|---|---|---|---|
| 3,178,051 A | 4/1965 | Bryant | |
| 3,237,803 A | 3/1966 | Bryant | |
| 3,325,048 A | 6/1967 | Edwards | |
| 3,375,954 A | 4/1968 | Arvid et al. | |
| 3,420,397 A | 1/1969 | Miller | |
| 3,425,382 A | 2/1969 | Johnson | |
| 3,468,467 A | 9/1969 | Amberg | |
| 3,471,075 A | 10/1969 | Wolf | |
| 3,485,412 A | 12/1969 | Hawley | |
| 3,580,468 A | 5/1971 | McDevitt | |
| 3,648,888 A | 3/1972 | Cheladze | |
| 3,930,589 A | 1/1976 | Koontz | |
| 3,995,740 A | 12/1976 | Amberg | |
| 4,049,122 A | 9/1977 | Maxwell | |
| 4,093,094 A | 6/1978 | Smalley | |
| 4,102,454 A | 7/1978 | Karevaara | |
| 4,106,397 A | 8/1978 | Amberg | |
| 4,117,971 A | 10/1978 | Itoh | |
| 4,122,964 A | 10/1978 | Morris | |
| 4,349,400 A | 9/1982 | Gilden | |
| 4,448,345 A | 5/1984 | Helms | |
| 4,616,761 A | 10/1986 | Nolan | |
| 4,708,255 A * | 11/1987 | Thompson | B29C 57/12 215/329 |
| 4,782,968 A | 11/1988 | Hayes | |
| 4,872,304 A * | 10/1989 | Thompson | B29C 55/00 215/344 |
| 4,904,512 A | 2/1990 | Yamada | |
| 5,040,691 A | 8/1991 | Hayes | |
| 5,062,568 A | 11/1991 | Hill | |
| 5,094,603 A | 3/1992 | Gellert | |
| 5,158,195 A * | 10/1992 | Thompson | B29C 55/00 215/344 |
| 5,240,131 A | 8/1993 | Keller | |
| 5,341,949 A * | 8/1994 | Hayes | B65D 41/48 215/253 |
| 5,725,120 A | 3/1998 | Ramsey | |
| 5,820,016 A | 10/1998 | Stropkay | |
| 5,829,608 A * | 11/1998 | Clerget | B65D 41/045 215/277 |
| 5,839,592 A | 11/1998 | Hayes | |
| 6,095,359 A | 8/2000 | Richmond | |
| 6,220,466 B1 | 4/2001 | Hayes | |
| 6,364,201 B1 | 4/2002 | Varano | |
| 6,413,625 B2 | 7/2002 | Rolle | |
| 6,588,654 B2 | 7/2003 | Nakashima | |
| 7,100,770 B2 | 9/2006 | DAmato | |
| 7,281,649 B2 | 10/2007 | Pyper, Jr. | |
| 7,481,356 B2 | 1/2009 | Stahlecker | |
| 7,611,026 B1 | 11/2009 | Bloom | |
| 7,677,435 B2 | 3/2010 | Stahlecker | |
| 7,905,821 B2 | 3/2011 | Stahlecker | |
| 7,972,669 B2 | 7/2011 | Matsuoka | |
| 7,984,846 B2 | 7/2011 | Messerschmid | |
| 8,146,796 B2 | 4/2012 | DAmato | |
| 8,172,127 B2 | 5/2012 | Frost | |
| 8,323,164 B2 | 12/2012 | Messerschmid | |
| 8,794,489 B2 * | 8/2014 | Bloom | B65D 35/46 222/494 |
| 9,682,805 B2 * | 6/2017 | Minnette | B65D 55/026 |
| 2003/0098286 A1 | 5/2003 | Bloom | |
| 2005/0098529 A1 | 5/2005 | Bloom et al. | |
| 2005/0284837 A1 | 12/2005 | Taber | |
| 2006/0118608 A1 | 6/2006 | Stahlecker | |
| 2007/0125785 A1 | 6/2007 | Robinson et al. | |
| 2007/0158294 A1 | 7/2007 | Tanaka et al. | |
| 2007/0187352 A1 | 8/2007 | Kras | |
| 2009/0159653 A1 | 6/2009 | Stahlecker | |
| 2009/0184020 A1 | 7/2009 | Messerschmid | |
| 2010/0140208 A1 * | 6/2010 | Parrinello | B65D 11/04 215/44 |
| 2010/0184877 A1 | 7/2010 | Miyagawa | |
| 2011/0174656 A1 | 7/2011 | DAmato | |
| 2011/0281704 A1 | 11/2011 | Messerschmid | |
| 2012/0241511 A1 | 9/2012 | Marshall | |
| 2012/0318805 A1 | 12/2012 | Leser | |
| 2013/0001287 A1 | 1/2013 | Stahlecker | |
| 2014/0116977 A1 | 5/2014 | Minnette | |
| 2014/0263151 A1 | 9/2014 | Russell et al. | |

OTHER PUBLICATIONS

PCT International Search Report and Written Opinion completed by the ISA/US on Jun. 29, 2016 and issued in connection with PCT/US2016/030369.

PCT International Search Report and Written Opinion completed by the ISA/EP on Mar. 3, 2014 and issued in connection with PCT/US2013/066899.

International Search Report and Written Opinion for International Application No. PCT/US2014/028882, dated Aug. 5, 2014, 10 pages.

Office Action dated Dec. 1, 2016 for U.S. Appl. No. 14/063,681.

* cited by examiner

Lid-retainer Ring Engages Floating Lid to Seal Against Filler Neck

Shoulder Engages Barrier Ring to Limit Sealing Force

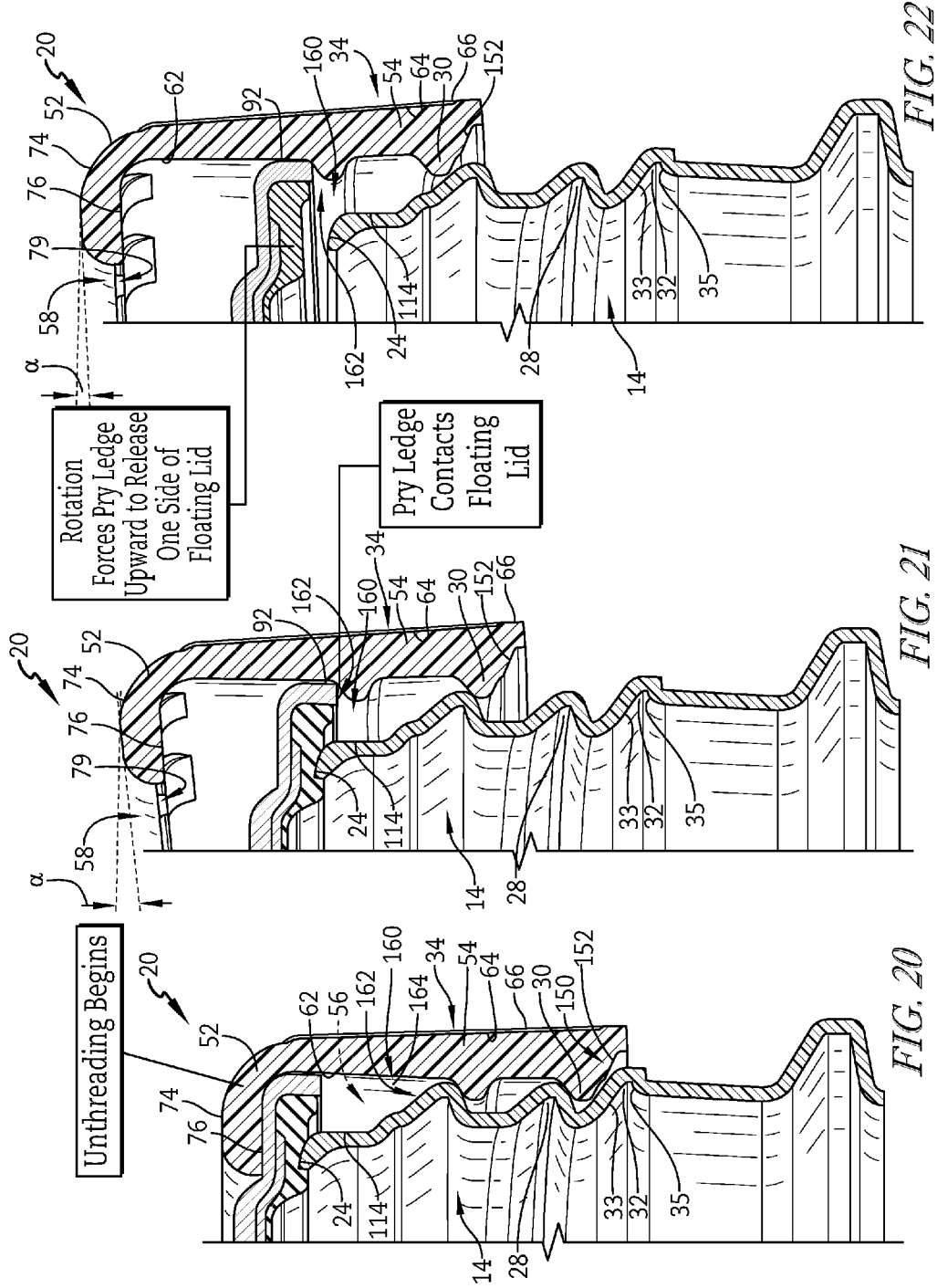

CONTAINER CLOSURE

PRIORITY CLAIM

This application claims priority under 35 U.S.C. § 119(e) to U.S. Provisional Application Ser. No. 62/154,995, filed Apr. 30, 2015, which is expressly incorporated by reference herein.

BACKGROUND

The present disclosure relates to closures for mounting on top of bottles or other containers, and in particular, to a closure including a floating lid and a lid-retainer ring. More particularly, the present disclosure relates to a closure that can withstand a high pressure, high temperature sterilization process known as retort.

SUMMARY

According to the present disclosure a canister includes a container and a closure. The container is formed to include a product-storage region and a mouth opening into the product-storage region. The closure is coupled selectively to the container to close the mouth to block access to the product-storage region when the closure is rotated in a clockwise direction. The closure includes a lid-retainer ring and a floating lid that covers the mouth of the container.

In illustrative embodiments, the lid-retainer ring and the floating lid are both made from plastics materials. When the closure is coupled to the container, the lid-retainer ring couples the floating lid to the container. Together, the lid-retainer ring and the floating lid cooperate to establish force-limiting means for limiting a closure-removal force required to separate the closure from the container to less than about 15 in-lbs after the canister survives a high-temperature, high-pressure retort process so that access to sterilized products in the product-storage region is provided to users having low grip strength.

In illustrative embodiments, the force-limiting means includes pressure-limiting means. In some embodiments, the pressure-limiting means includes a deformable floating lid. The deformable floating lid is configured to change in shape during the high-pressure, high-temperature retort process. During heating of the canister, the deformable floating lid is configured to bulge outwardly away from the container to increase a volume of the canister. As a result, pressure is reduced in the product-storage region during heating due to the increase in volume. During cooling of the canister, the deformable floating lid is configured to bulge inwardly toward the container to decrease a volume of the canister. As a result, vacuum in reduced in the product-storage region during cooling due to the decrease in the volume. The force required to separate the floating lid from the container is decreased when vacuum in the container is decreased.

In illustrative embodiments, the force-limiting means further includes a torque-limiting means for limiting over-tightening of the lid-retainer ring relative to the container so that the closure-removal force is minimized. In some embodiments, the torque-limiting means includes a torque inhibitor configured to block over rotation of the closure during installation of the closure on the container. Torque required to begin rotating the lid-retainer ring relative to the floating lid is decreased when installation torque is limited to predetermined amounts.

In illustrative embodiments, the force-limiting means includes ring-removal means for severing a thread bond formed between the lid-retainer ring and the filler neck without causing the floating lid to move relative to the container. In illustrative embodiments, the force-limiting means further includes lid-removal means for pivoting the floating lid relative to the filler neck to overcome vacuum force in the product-storage region acting on the floating lid.

In some embodiments, the lid-removal means includes a lid pry-off feature. The lid pry-off feature is configured to engage only a small portion of an edge of the floating lid during rotation of the lid-retainer ring in a closure-opening direction so as to convert the floating lid into a lever with a fulcrum located 180 degrees from the small portion. As a result, force applied to the lid-retainer ring is concentrated near the lid pry-off feature so as to overcome vacuum force in the product-storage region and separate the floating lid from the closure.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a partial perspective view of a canister in accordance with the present disclosure showing that the canister includes a container and a closure coupled to the container, portions of the canister have been broken away to reveal that the closure includes an outer lid-retainer ring configured to mate with the container and an inner floating lid is trapped between the lid-retainer ring and the container to close an open mouth formed in the container;

FIG. 2 is a sectional view taken along line 2-2 of FIG. 1 showing the closure tightened on the filler neck of the container to restrict movement of the floating lid and to close the open mouth included in the filler neck so that food products stored in the container are blocked from escaping the container through the open mouth;

FIG. 3 is an enlarged view of the circled region of FIG. 2 showing that the lid-retainer ring is formed to include a lid-retainer cavity and that the lid-retainer ring includes a top wall, a side wall extending downwardly to mate with the container, and a lid-retainer support that retains the floating lid in the lid-retainer cavity and further showing that the floating lid includes a polypropylene layer, a barrier layer (EVOH), and a gasket layer;

FIGS. 6A-8B are a series of views showing the canister of FIGS. 1 and 2 undergoing a high-temperature sterilization process known as retort;

FIG. 6A is a view similar to FIG. 2 of a canister on a conveyor moving toward an oven to undergo retort as suggested in FIG. 6B and showing that the canister has not entered the oven and, as such, the floating lid is un-deformed;

Figure 1:
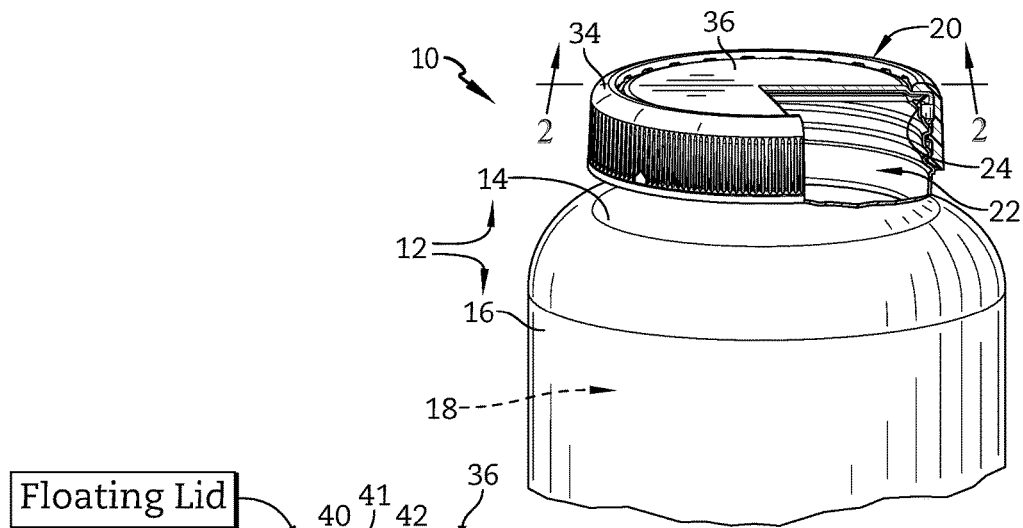
Figure 2:
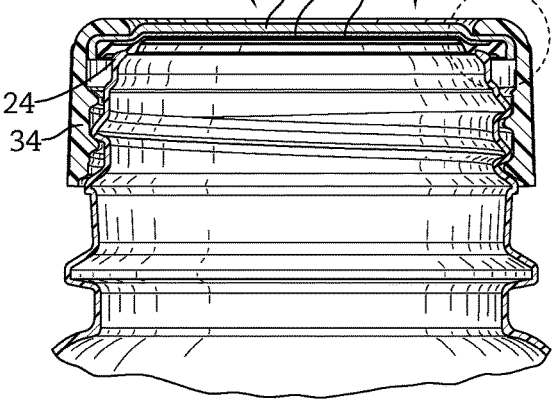
Figure 6A:
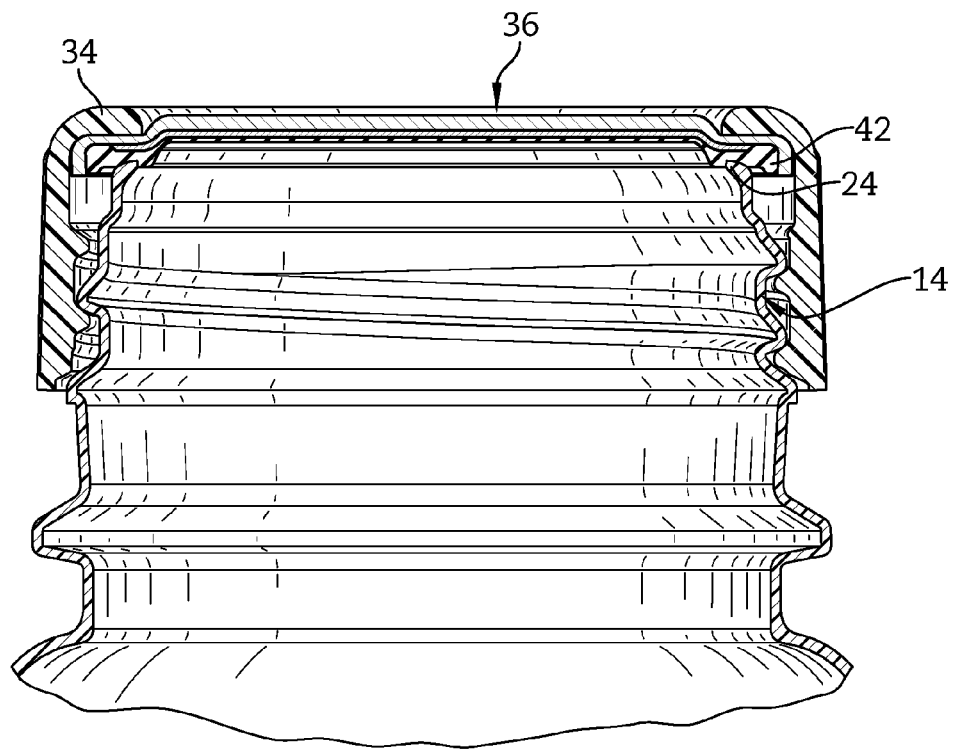
Figure 6B:
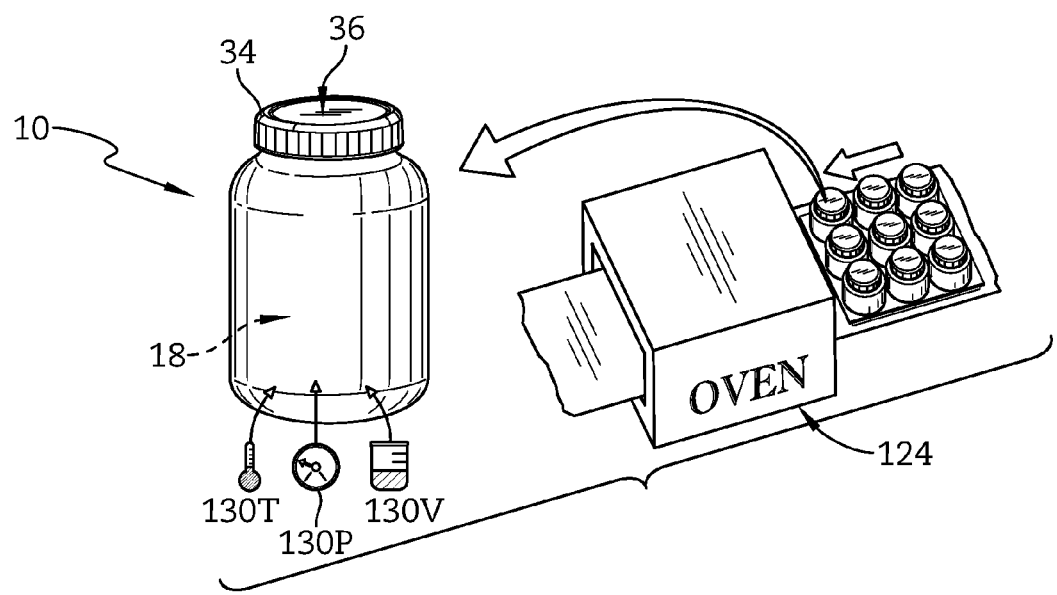
FIG. 6B is a diagrammatic view of a tray carrying nine canisters in accordance with the present disclosure, the tray of canisters moving along the conveyor toward the oven to undergo retort and an enlarged perspective view of one of those canisters before it is heated and pressurized in the oven.
Figure 7A:
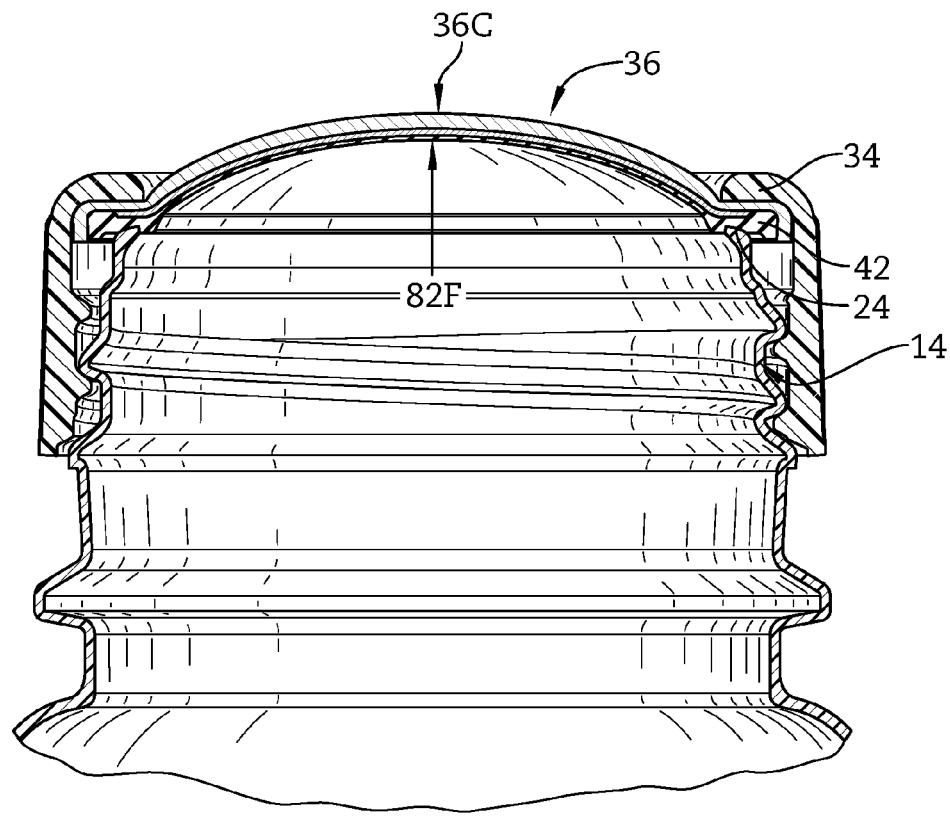
Figure 7B:
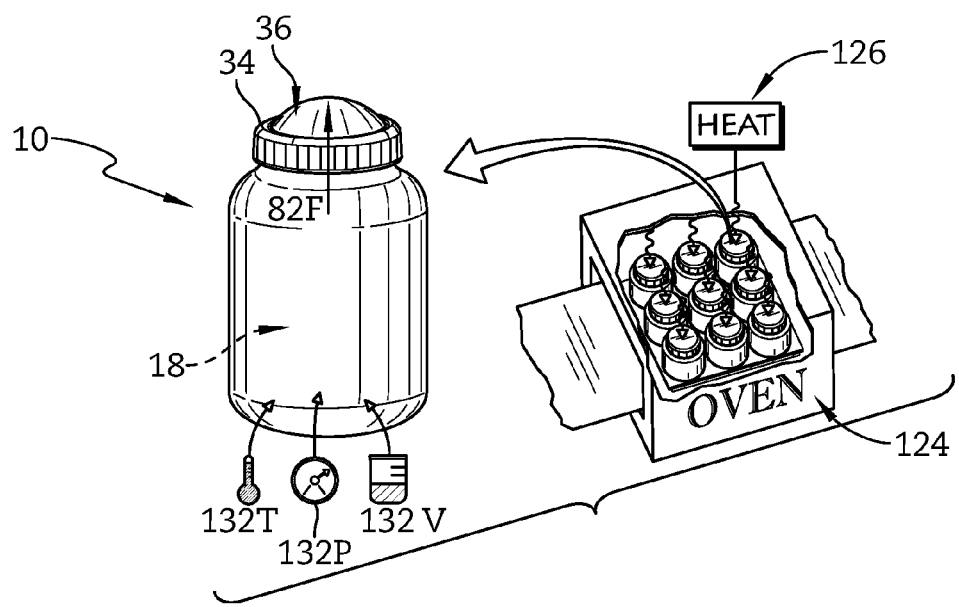
Figure 8A:
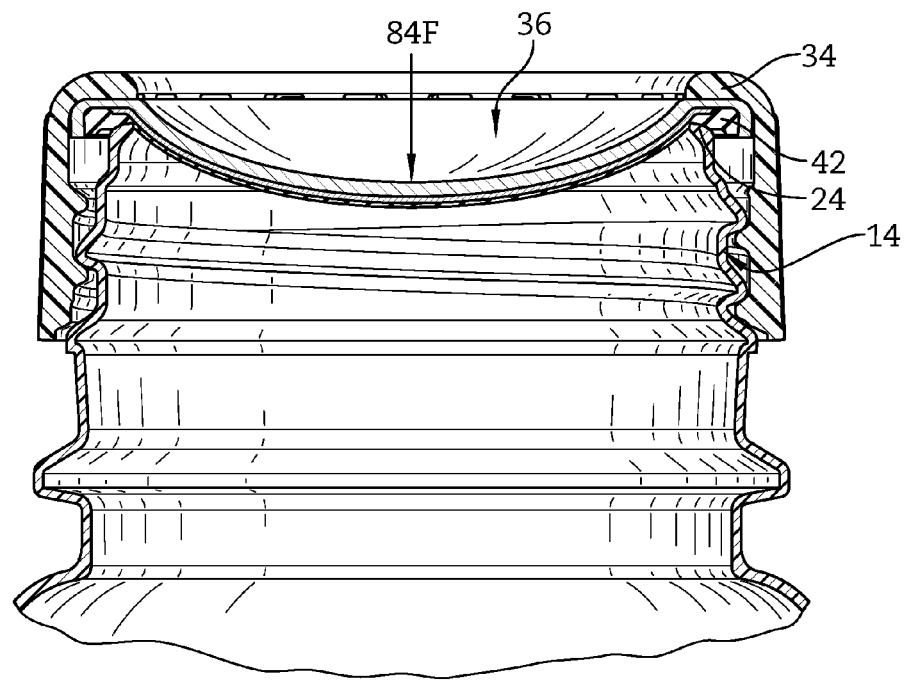
Figure 8B:
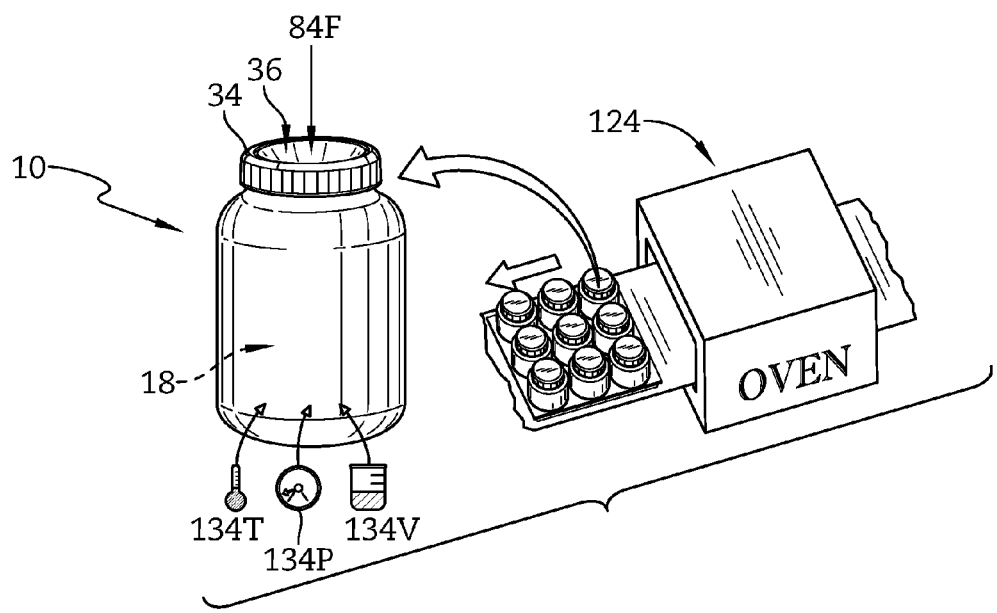
Figure 9:
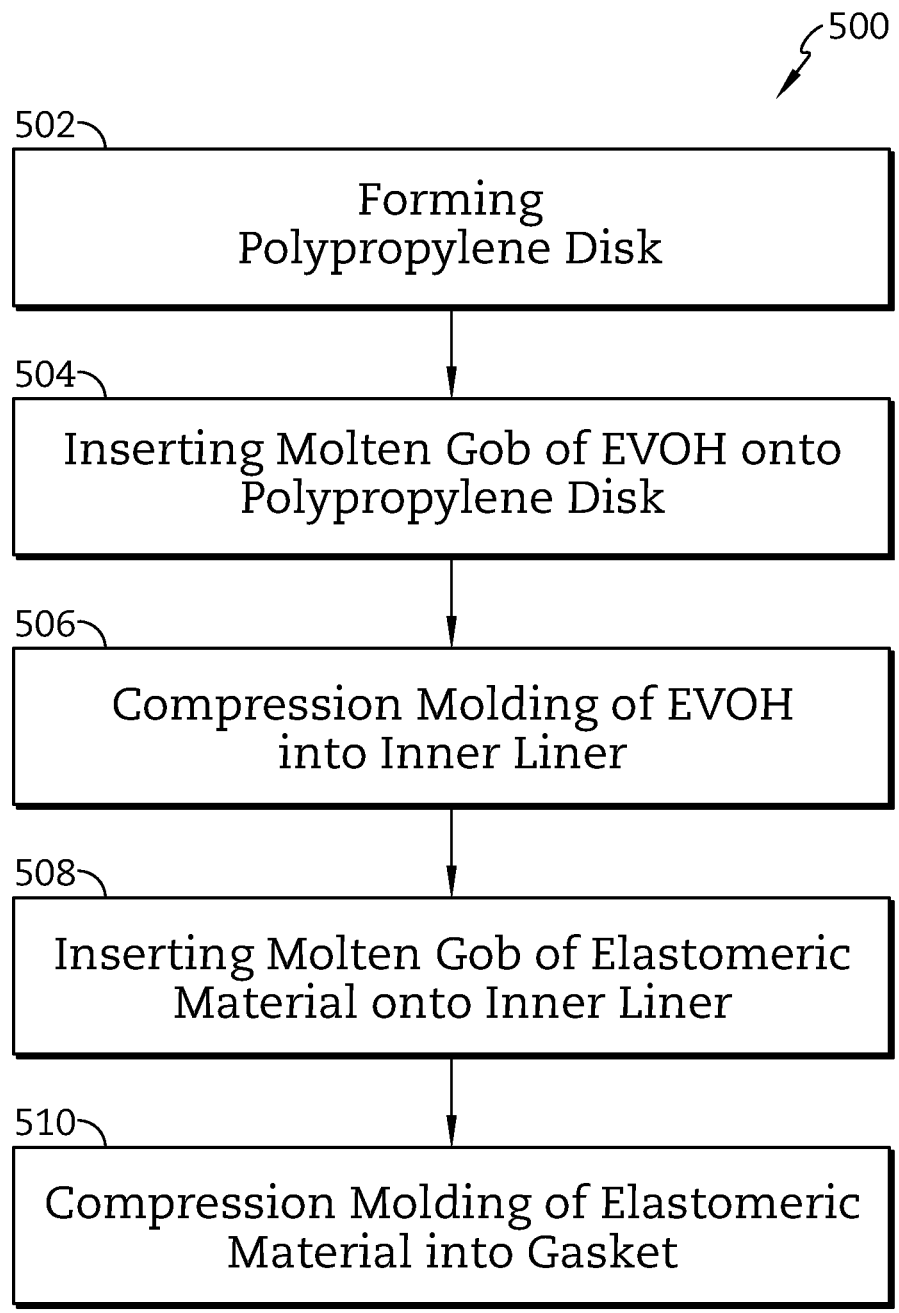
Figure 10A:
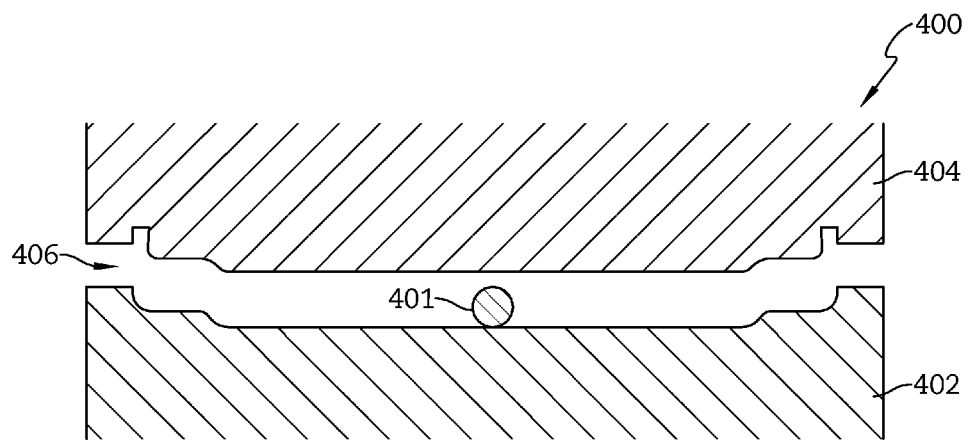
Figure 10B:
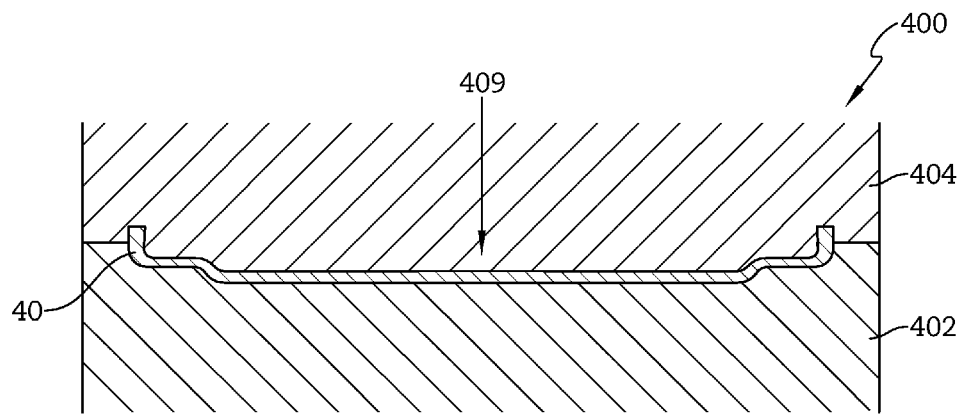
Figure 11A:
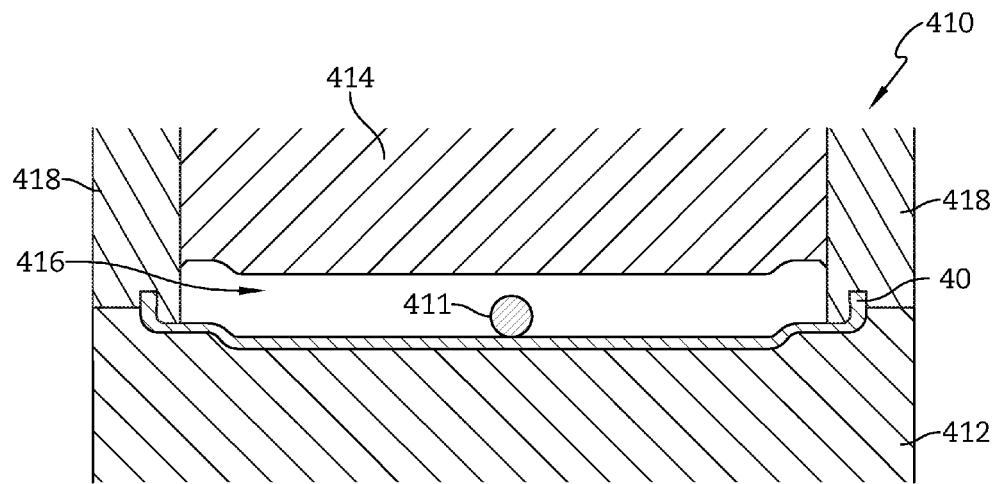
Figure 11B:
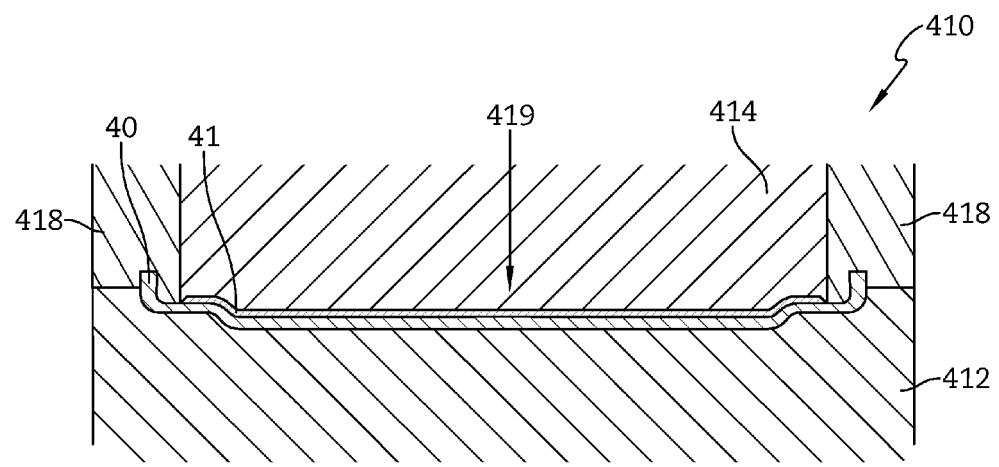
Figure 12A:
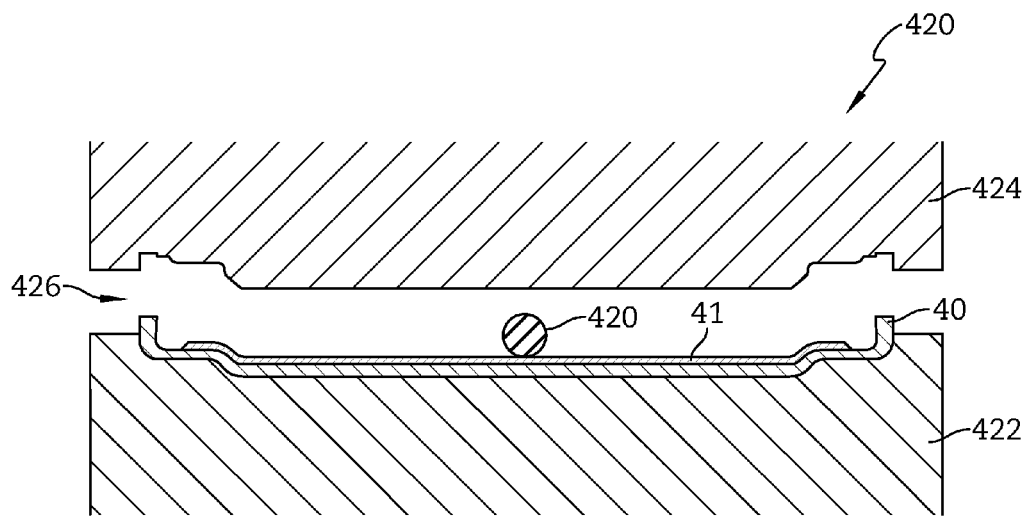
Figure 12B:
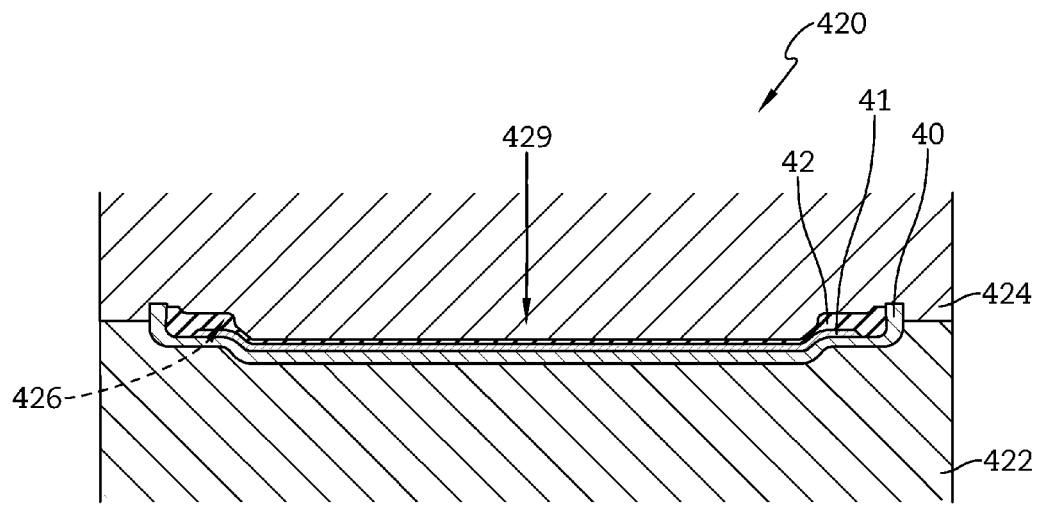
Figure 13:
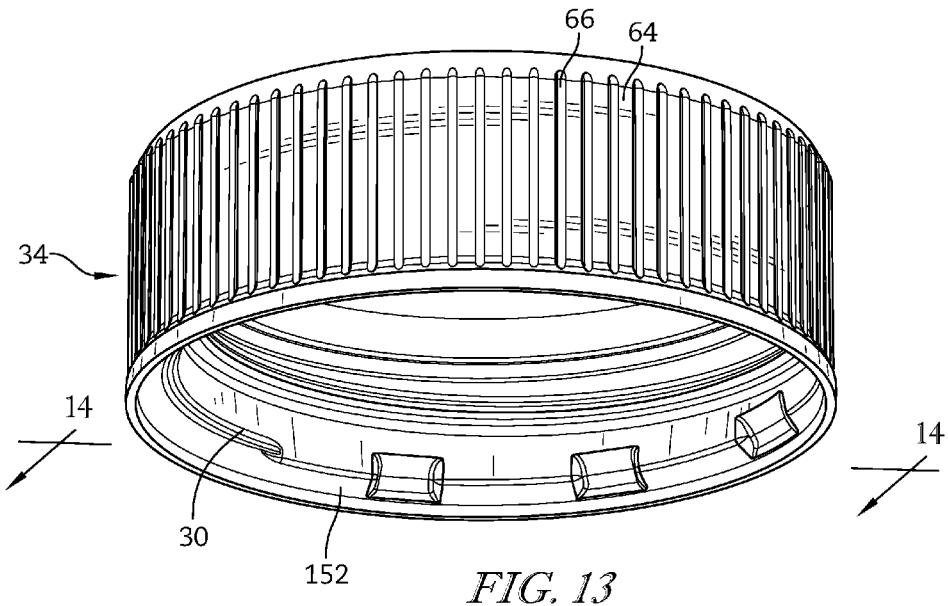
Figure 14:
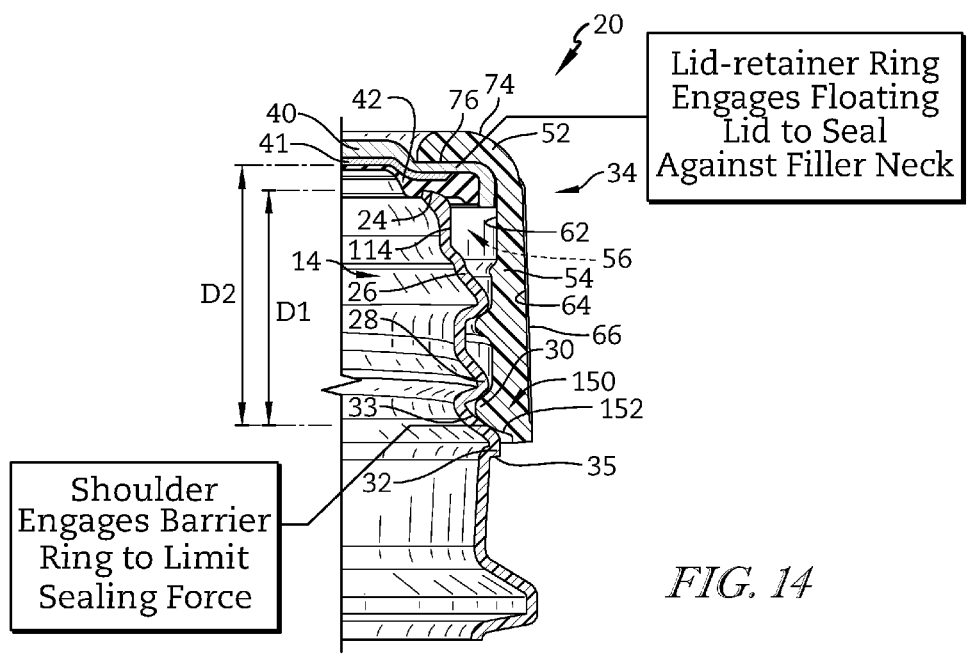
Figure 15:
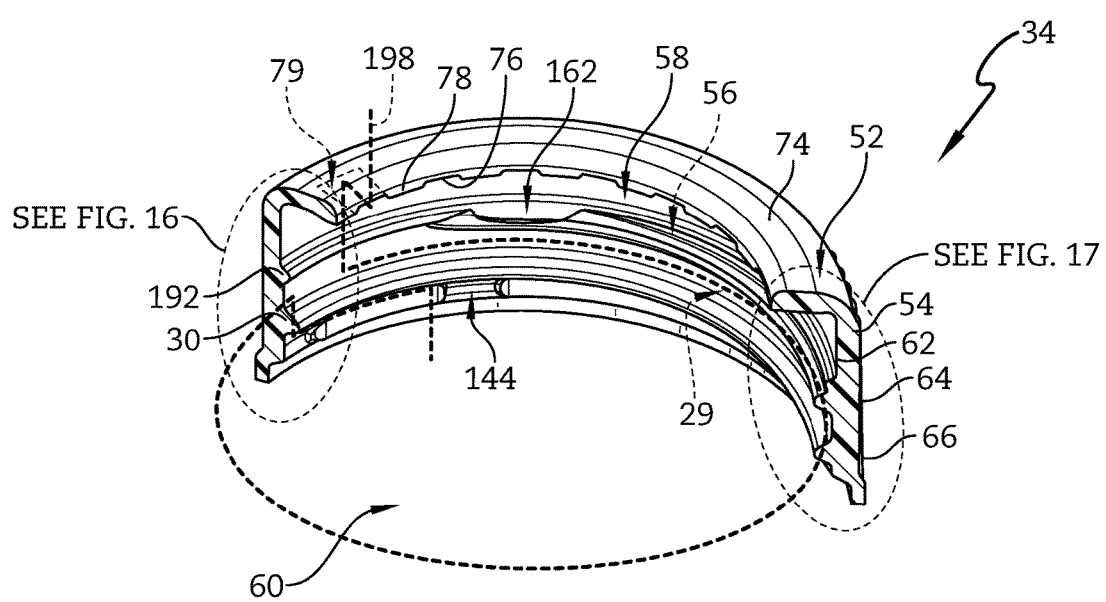
Figure 17:
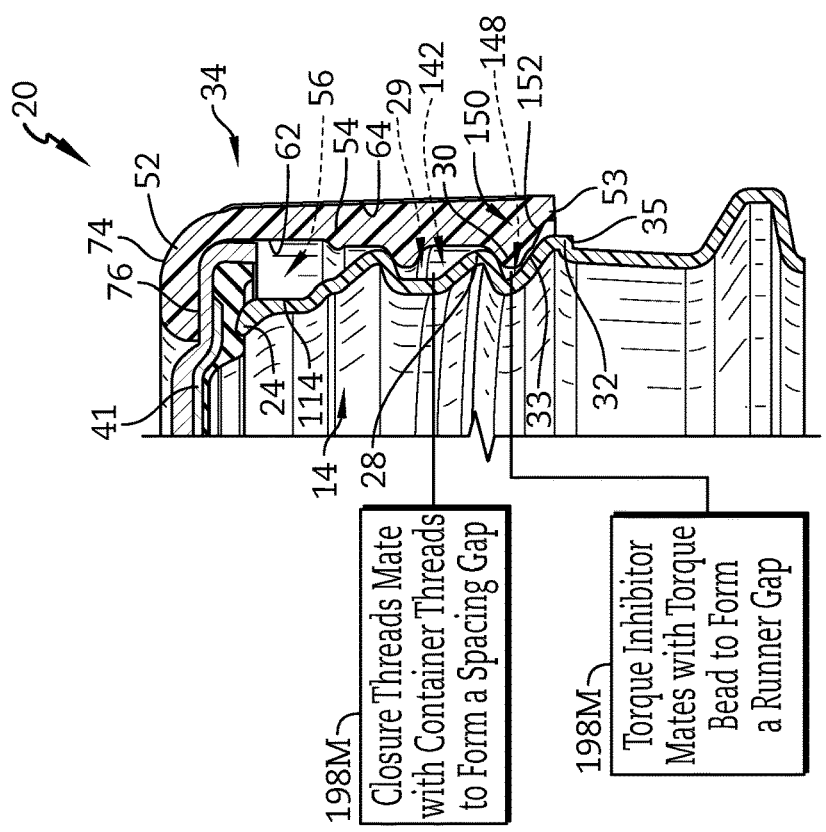
Figure 16:
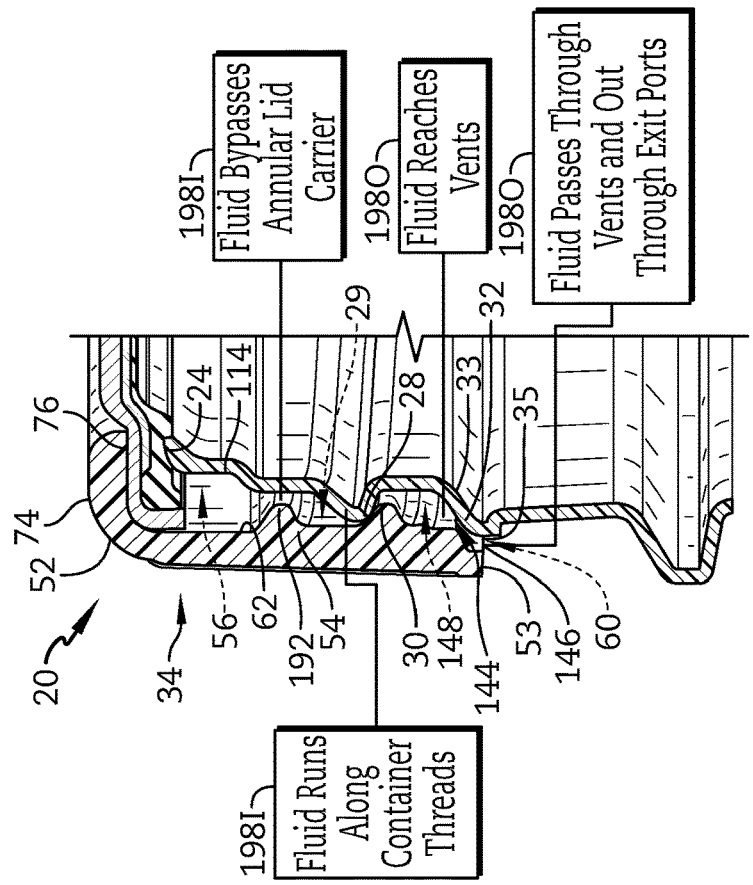
Figure 18:
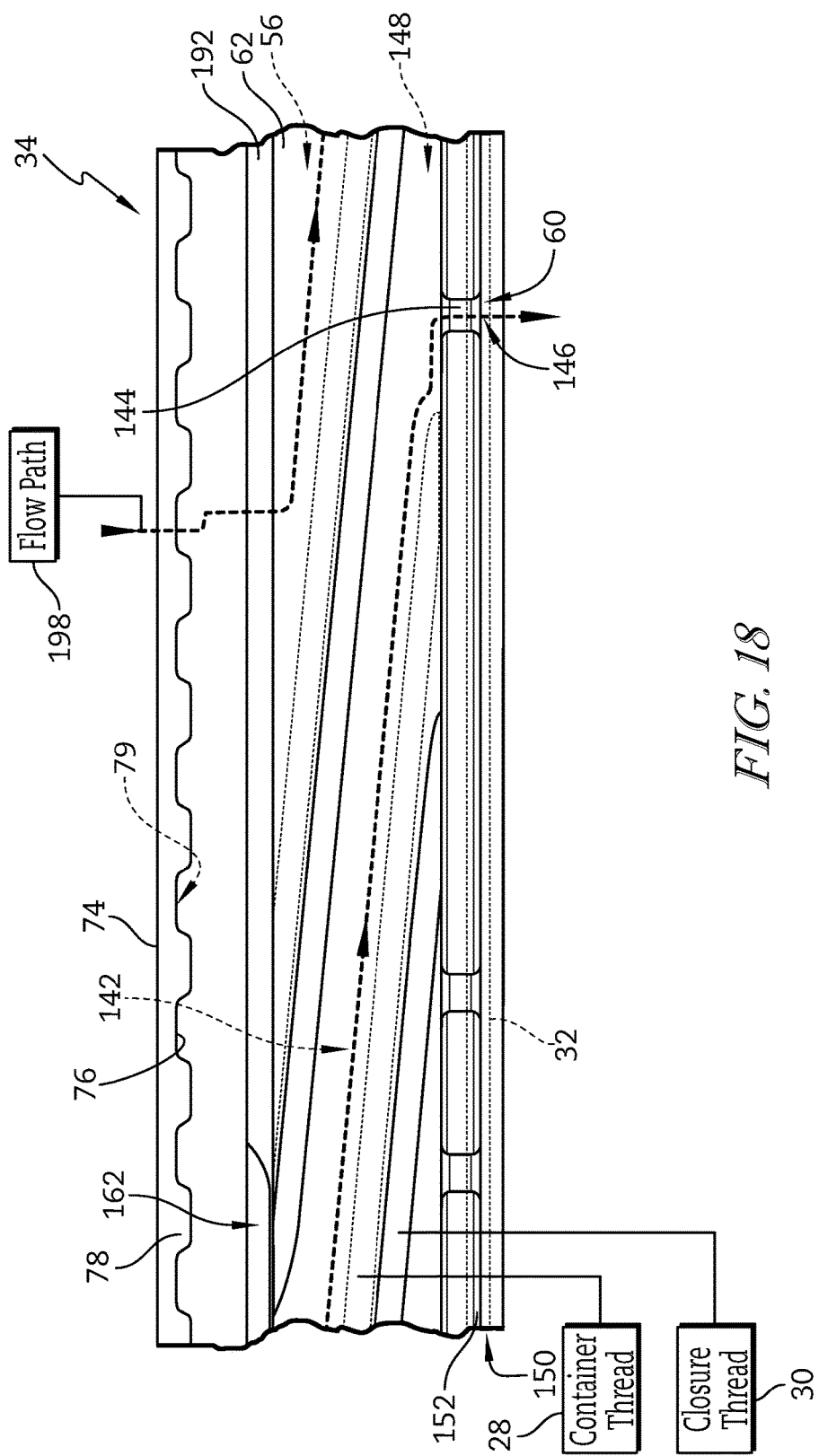
Figure 19:
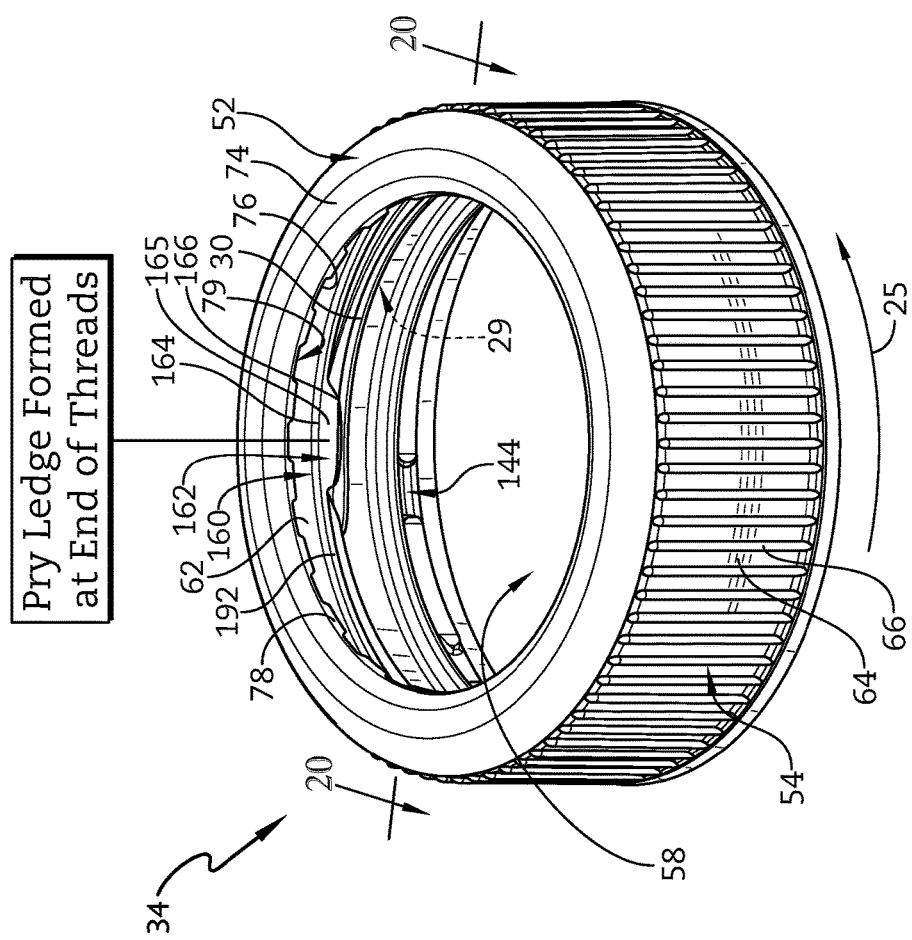

FIG. 7A is a view similar to FIG. 6A of the canister after it has been moved into the oven as suggested in FIG. 7B suggesting that the canister is heated and pressurized within the oven to sterilize the canister and food products stored within the canister and showing that the heat and pressure inside the canister have caused the floating lid to deform so that a center portion of the floating lid has moved upwardly through an aperture formed in the lid-retainer ring;

FIG. 7B is a view similar to FIG. 6B after the tray has moved into the oven to heat each of the nine canisters and an enlarged perspective view of the canister that was singled out in FIG. 6B showing that heat and pressure inside the canister have caused the center portion of the floating lid to expand and move upwardly through the aperture in the lid-retainer ring and the canister and that food products have been sterilized by the heat and pressure without bursting or damaging the canister;

FIG. 8A is a view similar to FIGS. 6A and 7A of the canister after it has been moved out of the oven as suggested in FIG. 8B showing that the canister has cooled so that pressure inside the canister has decreased causing the floating lid to deform so that the center portion has moved downwardly through the open mouth of the container;

FIG. 8B is a view similar to FIGS. 6B and 7B after the tray of canisters has moved out of the oven and an enlarged perspective view of the canister that was singled out in FIGS. 6B and 7B showing that the canister has cooled and the pressure inside the canister has decreased to cause the floating lid to deform so that the center portion of the floating lid has moved downwardly through the open mouth of the container;

FIG. 9 is a diagrammatic view of an illustrative manufacturing process in accordance with the present disclosure for manufacturing the floating lid included in the closure, the manufacturing process including the steps of forming a polypropylene disk, inserting a molten gob of EVOH onto the polypropylene disk, compression molding the molten gob into the barrier layer, inserting a molten gob of elastomeric material onto the barrier layer, and compression molding the elastomeric material into the gasket layer;

FIGS. 10A-12B are a series of diagrammatic views showing each step of the manufacturing process of FIG. 9;

FIG. 10A is a diagrammatic view a first compression mold in an open position showing the mold just after a gob of molten polypropylene has been inserted into a mold space formed in the first mold;

FIG. 10B is a view similar to FIG. 10A showing the first compression mold in the closed position forming the polypropylene disk;

FIG. 11A is a diagrammatic view showing a second compression mold in an open position showing the mold just after a gob of molten EVOH has been inserted onto the polypropylene disk in a mold space formed in the second mold;

FIG. 11B is a view similar to FIG. 11A showing the second compression mold in a closed position forming the barrier disk on the polypropylene disk;

FIG. 12A is a diagrammatic view showing a third compression mold in an open position showing the mold just after a gob of molten elastomeric material has been inserted onto the barrier disk in a mold space formed in the third mold;

FIG. 12B is a view similar to FIG. 12B showing the third compression mold in a closed position forming the gasket disk on the barrier disk;

FIG. 13 is a lower perspective view of the closure of FIG. 1 showing that the lid-retainer ring includes closure threads to mate with container threads on the filler neck of the container to force the floating lid against the filler neck to close and seal the opening of the container and a shoulder positioned to inhibit over-tightening of the closure;

FIG. 14 is a cross-sectional view taken along line 14-14 of FIG. 13 showing that the shoulder is positioned to allow lid spacers included on the lid-retainer ring to engage the floating lid to form a seal against the filler neck and engage a torque bead positioned on the filler neck to limit the sealing force exerted on the floating lid;

FIG. 15 is an upper perspective view of the lid-retainer ring of FIG. 13 with portions broken away to reveal a flow path through a drainage flow passageway as suggested in FIGS. 16-18;

FIG. 16 is an enlarged view of the lid-retainer ring of FIG. 15 showing an upper in-flow portion of the flow path where fluid on the top of the floating lid passes under lid gaps formed between the lid spacers, drops to the closure threads, and follows the closure threads and further showing a lower out-flow portion of the flow path where the fluid passes through a fluid vent cut into the shoulder and drops out of fluid exit ports located between retention tabs at the bottom of the lid-retainer ring;

FIG. 17 is an enlarged view of the lid-retainer ring of FIG. 15 showing a mid-flow portion of the flow path where fluid flows through a spacing gap formed between the closure threads and container threads and a runner gap formed between the shoulder and torque bead;

FIG. 18 is a flat development of the interior of the lid-retainer ring of FIG. 15 showing the container threads and torque bead in phantom as they mate with the closure threads and annular shoulder, respectively, and showing the fluid flow path as it passes through the lid gaps at the top of the lid-retainer ring, follows the closure threads to the annular shoulder, and flows through the vents and exit ports out the bottom of the lid-retainer ring;

FIG. 19 is an upper perspective view of the lid-retainer ring of FIG. 13 showing that a pry ledge is formed at the end of the closure threads to move therewith as the lid-retainer ring is rotated during removal of the closure from the container, as suggested in FIGS. 20-22;

FIG. 20 is a partial sectional view taken along line 20-20 of FIG. 19 showing the floating lid sealed with the filler neck as unthreading of the closure begins;

FIG. 21 is a view similar to FIG. 20 showing that the unthreading motion has caused the lid-retainer ring to be elevated and the pry ledge to be in contact with a lower portion of the floating lid which is still sealed to the filler neck due to vacuum pressure within the container formed during the retort process shown in FIGS. 6-8; and FIG. 22 is a view similar to FIG. 21 showing that continued unthreading motion raises the pry ledge and forces the floating lid to release form the filler neck.

DETAILED DESCRIPTION

A canister 10 in accordance with the present disclosure includes a container 12 formed to include a product-storage region 18 and a closure 20, as shown, for example, in FIG. 1. Closure 20 is configured to be coupled to container 12 to close a mouth 22 and block access to product-storage region 18. Closure 20 includes a lid-retainer ring 34 and a floating lid 36 that covers mouth 22. Closure 20 may be separated from container 12 to allow access to product-storage region 18 through mouth 22 formed in container 12. Together, lid-retainer ring 34 and the floating lid 36 cooperate to establish force-limiting means for limiting a closure-removal force to less than a predetermined amount after surviving a high-temperature, high-pressure sterilization process known as retort so that access to sterilized products in the product-storage region 18 is provided to users with low grip strength. In the illustrative embodiment, the closure-removal force is less than about 15 in-lbs.

Closure 20 includes a drainage flow passageway that allows fluid on top of closure 20 to drain through closure 20 and exit out a lower aperture 60 of lid-retainer ring 34 as shown in FIG. 15. Canister 10 is also configured to include a torque-limiting means 150 for limiting over-tightening of the closure 20. In some embodiments, the torque-limiting means 150 includes a torque inhibitor 150 that limits clockwise rotation after closure 20 has been rotated a predetermined amount relative to filler neck 14 of container 12 as shown in FIGS. 13-14. In some embodiments, closure 20 includes ring-removal means 34 for severing a thread bond formed between lid-retainer ring 34 and container 12 without causing the floating lid 36 to move relative to container 12.

In some embodiments, closure 20 includes lid-removal means 160 for pivoting floating lid 36 relative to container 12 to overcome vacuum force in product-storage region 18 acting on floating lid 36 and to sever a lid bond formed between floating lid 36 and container 12 during the retort process. In some embodiments, closure 20 includes lid-removal means 160 for pivoting floating lid 36 relative to container 12 to overcome vacuum force in product-storage region 18 acting on the floating lid 36. In some embodiments, lid-removal means 160 includes a lid pry-off feature 160 that assists with removal of floating lid 36 from mouth 22 of container 12 as closure 20 is rotated in a counter-clockwise direction 25 as suggested in FIGS. 19-22. Closure 20 and container 12 are configured to withstand retort as suggested in FIGS. 6A-8B. Floating lid 36 deforms during retort, limiting the decrease in pressure or vacuum formed inside canister 10 during retort.

Canister 10 is configured to store food or other products in product-storage region 18 as suggested in FIG. 1. Container 12 includes a body 16, a filler neck 14 coupled to body 16, and a barrier ring 32 coupled to filler neck 14 as shown in FIG. 14. Body 16 and filler neck 14 cooperate to define product-storage region 18. Mouth 22 is formed in filler neck 14 and is arranged to open into product-storage region 18 to allow communication therewith. Closure 20 is configured to mount on filler neck 14 of container 12 to cover mouth 22. As suggested in FIGS. 20-22, closure 20 is configured to be removed from filler neck 14, and thus, allow communication with product-storage region 18 when closure 20 is rotated in a counter-clockwise direction. Barrier ring 32 is coupled to filler neck 14 adjacent to where filler neck 14 is coupled to body 16. Barrier ring 32 extends radially outward from filler neck 14.

Filler neck 14 includes a brim 24, a neck wall 26, and one or more container threads 28 as shown in FIG. 14. Brim 24 is formed to mate with floating lid 36 to create a seal between brim 24 and floating lid 36. Neck wall 26 extends downwardly from brim 24 and is coupled to body 16 of container 12. Brim 24 and neck wall 26 are annular and are formed to define mouth 22. Container threads 28 are coupled to neck wall 26 and extend radially outwardly and away from both neck wall 26 and mouth 22. Container threads 28 cooperate with one or more closure threads 30 included in closure 20 to enable closure 20 to mate with filler neck 14.

Figure 3:
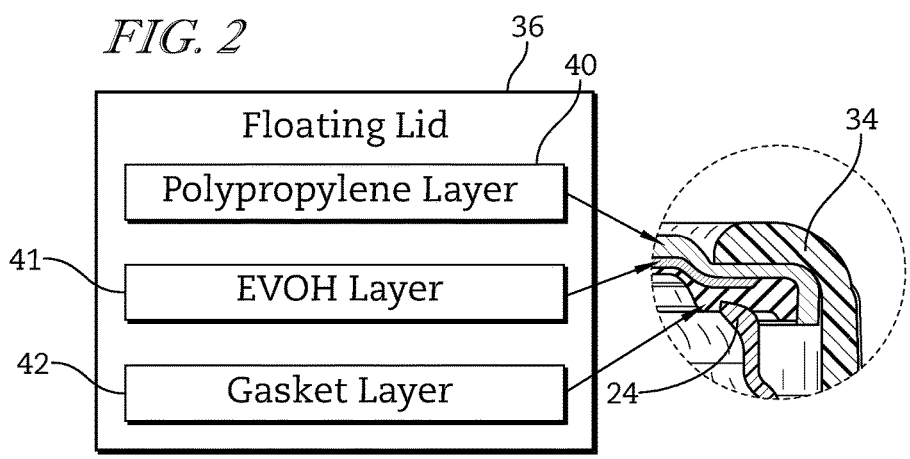
Figure 4:
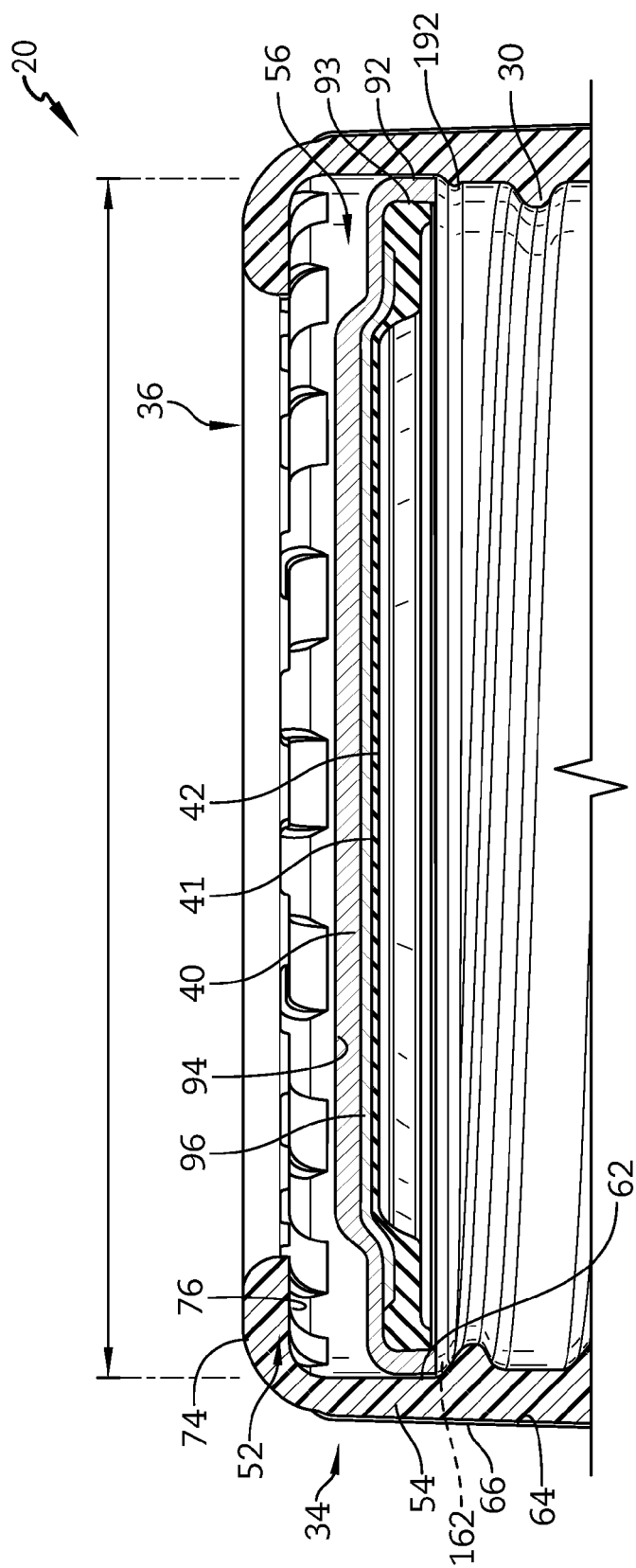
FIG. 4 is a sectional view of the closure of FIGS. 1-3 showing that the floating lid includes, from top to bottom, the polypropylene layer, the barrier layer (EVOH), and the gasket layer.
Figure 5:
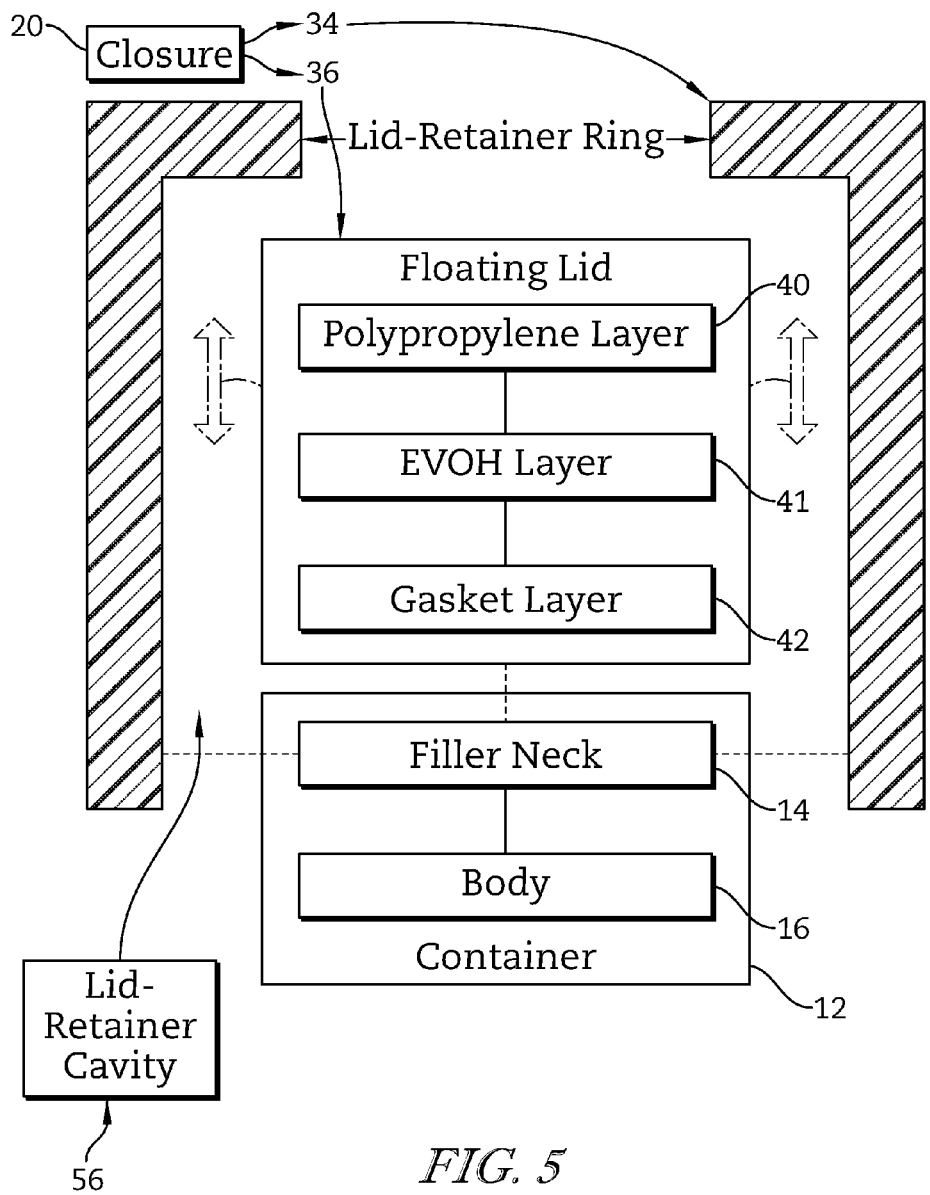
FIG. 5 is a diagrammatic view of the canister of FIG. 1 showing that the canister comprises the container and the closure including the lid-retainer ring and the floating lid including the polypropylene layer, the barrier (EVOH) layer, and the gasket layer.

Closure 20 includes lid-retainer ring 34 and floating lid 36 as illustrated in FIG. 1. Lid-retainer ring 34 is configured to trap floating lid 36 when closure 20 is uncoupled from container 12 as shown in FIG. 4. Lid-retainer ring 34 is configured to mate with filler neck 14 to trap floating lid 36 between lid-retainer ring 34 and brim 24 of filler neck 14 as shown in FIGS. 1-3, 6A-8A, 14, 16-17, and 20-22. Floating lid 36 is configured to seal product-storage region 18 when closure 20 is mated with container 12.

Lid-retainer ring 34 includes a top wall 52 and an annular side wall 54 coupled to top wall 52 to extend downwardly from top wall 52 and terminate at a bottom edge 53 as shown in FIGS. 16 and 17. Top wall 52 and annular side wall 54 are formed to define an interior region 56 of lid-retainer ring 34. An upper aperture 58 is formed in top wall 52 and opens into interior region 56, as shown in FIG. 15. A lower aperture 60 is spaced apart from upper aperture 58 and is formed in annular side wall 54 to open into interior region 56. Lower aperture 60 and interior region 56 are sized to receive filler neck 14 and floating lid 36. Upper aperture 58 is sized such that filler neck 14 and floating lid 36 are blocked from passing through upper aperture 58.

Annular side wall 54 includes an inner surface 62 and an outer surface 64 as shown in FIG. 14. In illustrative embodiments, outer surface 64 includes a number of vertical ribs 66 as shown in FIG. 13. Each vertical rib 66 may be spaced equidistant from the next closest vertical rib 66. The number of vertical ribs 66 aid a user of canister 10 to grip lid-retainer ring 34 when mating and removing closure 20 and container 12.

Inner surface 62 of annular side wall 54 includes one or more closure threads 30, a shoulder 152, and lid pry-off feature 160 as shown in FIG. 20. Closure threads 30 extend inwardly into interior region 56. In one example, closure threads 30 are known as jump threads. Jump threads have a relatively large outer surface radius when viewing a cross section of the thread profile and the thread profile when viewed in cross section is generally symmetric. Jump threads may be used to simplify manufacturing with injection molding technology.

A thread gap 29 extends between upper and lower sections of closure threads 30 as shown in FIGS. 15-17. Thread gap 29 is formed to mate with one or more container threads 28 included on filler neck 14. Thread gap 29 and container threads 28 cooperate such that when closure 20 is mated to filler neck 14, twisting closure 20 in a first direction causes closure 20 to become coupled to filler neck 14 and rotating closure 20 in a second direction opposite the first direction, causes closure 20 to separate from filler neck 14. In illustrative embodiments, the first direction may be clockwise and the second direction may be counter-clockwise.

Closure 20 includes torque-limiting means 150 for limiting over-tightening of the lid-retainer ring 24 onto filler neck 14 as shown in FIGS. 13 and 14. In the illustrative embodiment, torque-limiting means 150 includes torque inhibitor 150 to control the torque and subsequent compressive forces between brim 24 of filler neck 14 and floating lid 36 when closure 20 is mounted on container 12 as suggested by FIGS. 13 and 14.

Torque inhibitor 150 includes barrier ring 32 of container 12 and shoulder 152 formed on inner surface 62 of lid-retainer ring 34. Barrier ring 32 is fixedly coupled to filler neck 14 to be a predetermined distance D1 from brim 24. Similarly, shoulder 152 is fixedly coupled to inner surface 62 to be a predetermined distance D2 from top wall 52 of lid-retainer ring 34. In one illustrative embodiment, distances D1, D2 may be set in relation to the thickness of floating lid 36 such that a predetermined sealing force is created between filler neck 14 and floating lid 36 when closure 20 is mounted on container 12.

Barrier ring 32 includes a top bead surface 33 and a bottom bead surface 35 as shown in FIG. 14. Top bead surface 33 may be angled downwardly as it extends radially outwardly from filler neck 14. Shoulder 152 extends radially outward of inner surface 62. Shoulder 152 may be angled downwardly as it extends radially outward from inner surface 62.

Barrier ring 32 is configured to extend radially past inner surface 62 when closure 20 is coupled to container 12 as shown in FIG. 14. As closure 20 is being screwed onto container 12, top bead surface 33 of barrier ring 32 abuts against shoulder 152 forming annular torque inhibitor 150. Angled bead surface 33 and angled shoulder 152 may be complimentary in shape such that bead surface 33 is received tightly against shoulder 152. Shoulder 152 blocks barrier ring 32 from extending past shoulder 152 into closure threads 30 on inner surface 62. In this way, barrier ring 32 is positioned below closure threads 30 and spaced apart from top wall 52 to locate shoulder 152 therebetween. This minimum distance between barrier ring 32 and top wall 52 of lid-retainer ring 34 is predetermined to reduce compressive forces from top wall 52 onto floating lid 36. Compressive forces on floating lid 36 between top wall 52 may also be minimized.

During installation of closure 20 on container 12, high capacity capping machines may apply high capper application torques to closure 20. When jump threads are used as closure threads 30, there may be a risk of overtightening closure 20 and stripping closure threads 30. During installation, closure threads 30 are wedged between container threads 28 and the barrier ring 32, also called an A-bead, thus limiting the amount of diametric hoop stretch closure 20 will achieve and keep it from expanding and stripping over. Torque inhibitor 150 is further configured to provide means for blocking stripping of closure threads 30 while limiting seal compression between lid-retainer ring 34 and floating lid 36.

Closure 20 includes lid-removal means 160 for pivoting floating lid 36 relative to filler neck 14 to overcome vacuum force in product-storage region 18 acting on floating lid 36 as suggested in FIG. 19. Illustratively, lid-removal means 160 includes lid pry-off feature 160.

Lid pry-off feature includes pry ledge 162 formed on side wall 54 as shown in FIG. 19. Pry ledge 162 is formed at an upper end of closure threads 30 and supports floating lid 36 when closure 20 is not on container 12. Pry ledge 162 may be formed at a helical angle to top wall 52 of lid-retainer ring 34. When lid-retainer ring 34 is rotated in a counter-clockwise direction to remove closure 20 from container 12, pry ledge 162 is configured to abut against floating lid 36 to pry floating lid 36 from container 12 when lid-retainer ring 34 is removed from container 12. As pry ledge 162 abuts against floating lid 36, the angled shape of pry ledge 162 provides means for lifting up on floating lid 36 to break the seal with mouth 22. Sometimes, lid bonds form between floating lid 36 and filler neck 14. Pry ledge 162 lifts up on floating lid 36 to sever the lid bonds.

Pry ledge 162 is an annular flange that extends radially inwardly away from annular side wall 54 of lid-retainer ring 34 towards interior region 56 as shown in FIGS. 19-22. Pry ledge 162 includes a back edge 164, a front edge 166, and an inclined surface 165 that extends to front edge 166 as shown in FIG. 19. Back edge 164 is configured to be closer to top wall 52 than front edge 166.

In one illustrative embodiment, a user may unthread closure 20 from container 12 by rotating lid-retainer ring 34 in a counter-clockwise rotation, as shown, for example, in FIG. 20. Unthreading lid-retainer ring 34 drives lid-retainer ring 34 upward while a vacuum force created between container 12 and floating lid 36 keeps floating lid 36 in place on filler neck 14. The helical shape of closure threads 30 and container threads 28 cause lid-retainer ring 34 to tilt at an angle α relative to horizontal as shown in FIG. 21. Thus, one side of lid-retainer ring 34 is closer to barrier ring 32 than an opposite side thereof. In the illustrative embodiment, a side of lid-retainer ring 34 where pry ledge 162 is located is in an elevated position relative to the opposing side of lid-retainer ring 34 as shown in FIG. 21.

The lid-retainer ring 34 travels upward until pry ledge 162 contacts a perimeter edge 92 of floating lid 36. Pry ledge 162 contacts a limited portion of perimeter edge 92 on one side of floating lid 36 due to the size and location of pry ledge 162 on lid-retainer ring 34. Continued rotation of lid-retainer ring 34 drives pry ledge 162 upward against perimeter edge 92 of floating lid 36 to lift the one side of floating lid 36 away from brim 24 of filler neck 14 as shown in FIG. 22. Pry ledge 162 concentrates the force applied to floating lid 36 to one side thereof, making removal of floating lid 36 easier than lifting the entire floating lid 36 at once. As the one side of floating lid 36 is raised, the seal created with filler neck 14 is broken, allowing the pressure within the container 12 to match an ambient pressure on the outside of container 12 and reducing the vacuum force created between container 12 and floating lid 36. Closure 20 may then be removed from container 12. The pivot arm formed by floating lid 36 helps sever any lid bonds formed between floating lid 36 and filler neck 14.

In the illustrative embodiment, an annular lid-carrier ring 192 is coupled to annular side wall 54 to extend radially inward into interior region 56 as shown in FIG. 4. Top wall 52, annular side wall 54, annular lid-carrier ring 192, and pry ledge 162 cooperate to allow for limited movement of floating lid 36 in both the axial and radial directions such that floating lid 36 is blocked from escaping interior region 56.

Top wall 52 of lid-retainer ring 34 is coupled to inner surface 62 of annular side wall 54 and prevents floating lid 36 from escaping interior region 56 through upper aperture 58. As shown in FIGS. 15-18, top wall 52 includes an upper surface 74, a lower surface 76 spaced apart and opposite upper surface 74, and a number of lid spacers 78 extending from lower surface 76. Lid spacers 78 extend downwardly away from lower surface 76 toward interior region 56. Lid spacers 78 prevent floating lid 36 from engaging lower surface 76. Lower surface 76 of top wall 52 and lid spacers 78 form to create lid gaps 79. Each lid spacer 78 is spaced equidistant from the next closest lid spacer 78.

Closure 20 also includes a drainage flow passageway configured to drain fluid from on top of floating lid 36 through upper aperture 58, through interior region 56 of lid-retainer ring 34, and out through lower aperture 60 as shown in FIGS. 15-18. As suggested by FIG. 18, the drainage flow passageway includes lid gaps 79, a spacing gap 142 formed to be included between an underside portion of closure threads 30 and container threads 28, a runner gap 148 formed to be included between the underside portion of closure threads 30 and torque inhibitor 150 formed by barrier ring 32 and shoulder 152, one or more fluid vents 144 formed in shoulder 152, and fluid exit ports 146 near aperture 60. The drainage flow passageway allows for a continuous fluid flow path 198 to extend between the top of floating lid 36 and lower aperture 60, as shown, for example, in FIGS. 15 and 18.

The drainage flow passageway is configured such that liquid on top of floating lid 36 drains through lid gaps 79 into interior region 56, where filler neck 14 and inner surface 62 of lid-retainer ring 34 force liquid into spacing gap 142 included in closure threads 30 as part of an upper in-flow path 198I as shown in FIG. 16. Fluid travels along closure threads 30 in spacing gap 142 to runner gap 148 as part of a central mid-flow path 198M as shown in FIG. 17. Fluid travels through runner gap 148 to vents 144 and out of lower aperture 60 through exit ports 146 as part of a lower out-flow path 198O as shown in FIG. 16.

Spacing gap 142 is located adjacent to and formed with thread gap 29 formed between closure threads 30 on inner surface 62. Spacing gap 142 and thread gap 29 are formed to be one continuous pathway as shown in FIG. 17. Spacing gap 142 provides a conduit for fluid to flow between container threads 28 and inner surface 62 of side wall 54 after fluid drains through lid gaps 79 into interior region 56. Fluid can flow through spacing gap 142 to the bottom of closure threads 30 as gravity pulls the fluid downward.

Vents 144 are formed in shoulder 152 near lower aperture 60 in order to provide a conduit for fluid to flow when barrier ring 32 is mated with shoulder 152. Fluid flows through spacing gap 142, through runner gap 148, and into vents 144 without being blocked by the interaction of barrier ring 32 with shoulder 152. Exit ports 146 are in fluid communication with vents 144 and direct fluid to flow from vents 144 out of lower aperture 60.

Closure 20 includes various features as suggested in FIGS. 13-15 and 19-22. Closure 20 is formed to include the drainage flow passageway that allows fluid on top of closure 20 to drain through closure 20 and exit out a lower aperture 60 of lid-retainer ring 34 as shown in FIG. 15. Canister 10 is also configured to include torque inhibitor 150 that limits clockwise rotation after closure 20 has been rotated a predetermined amount relative to filler neck 14 of container 12 as shown in FIGS. 13-14. Closure 20 further includes lid pry-off feature 160 that assists with removal of floating lid 36 from mouth 22 of container 12 as closure 20 is rotated in a counter-clockwise direction 25 as suggested in FIGS. 19-22. Closure 20 and container 12 are configured to withstand a high temperature and high-pressure sterilization process known as retort as suggested in FIGS. 6A-8B. Floating lid 36 deforms during retort, limiting the decrease in pressure inside canister 10 during retort. Reference is hereby made to U.S. application Ser. No. 14/063,681, filed Oct. 25, 2013 and U.S. application Ser. No. 14/216,208, filed Mar. 17, 2014 for disclosure relating to closures in accordance with the present disclosure, each application being hereby incorporated by reference in its entirety herein.

During the retort process, closure 20 may bond with container 12. In some embodiments, lid-retainer ring 34 bonds with threads of filler neck 14 to form one or more thread bonds therebetween. In some embodiments, floating lid 36 bonds with filler neck 14 to form one or more lid bonds therebetween. Illustratively, the bonds are formed when closure 20 and filler neck 14 melt and couple together. Closure 20 includes ring-removal means 34 for breaking or severing the thread bonds formed between lid-retainer ring 34 and filler neck 14. In the illustrative embodiment, lid-retainer ring 34 and floating lid 36 cooperate to provide the ring-removal means 34 due to the lid-retainer ring 34 being free to rotate relative to the floating lid 36 so that the thread bonds may be severed without moving floating lid 36. As a result, the thread bonds may be severed independently of severing the lid bonds so that a lower force is needed to remove closure 20. Illustratively, the lid bonds are severed by lifting up on floating lid 36 with lid-removal means 160.

As shown in FIG. 4, floating lid 36 includes a disk 40, an inner liner 41, and a gasket 42. Disk 40 includes an outer surface 94, an inner surface 96 spaced apart and opposite outer surface 94, an outer perimeter edge 92, and an inner perimeter edge 93. Inner liner 41 is located between disk 40 and gasket 42. Inner liner 41 engages and is coupled to inner surface 96 of disk 40. Gasket 42 engages and is coupled to inner surface 96 of disk 40 including inner perimeter edge 93 and inner liner 41.

In another embodiment, a floating lid includes a disk, an inner liner, and a gasket. The disk includes an outer surface, an inner surface spaced apart and opposite the outer surface, an outer perimeter edge, and an inner perimeter edge. The inner liner has a wider diameter and the inner liner engages the inner perimeter edge of the disk. The gasket engages the inner perimeter edge of the disk and the inner liner.

Floating lid 36 is trapped inside lid-retainer ring 34 as shown in FIG. 4. As suggested by FIG. 1, floating lid 36 blocks products stored inside canister 10 from escaping through mouth 22. Gasket 42, coupled to disk 40 and inner liner 41, mates with filler neck 14 to form a seal between floating lid 36 and filler neck 14 as shown in FIG. 3.

In the illustrative embodiment, disk 40 is made of polypropylene. In other illustrative embodiments, disk 40 may be made of any suitable polymeric material. In still other illustrative embodiments, disk 40 may be made of a combination of polymeric materials. Inner liner 41 is made, for example, of Ethylene Vinyl Alcohol (EVOH). EVOH acts as an oxygen barrier to protect products stored in product-storage region 18.

Gasket 42 is coupled to disk 40, as shown in FIG. 14. Gasket 42 blocks products stored within product-storage region 18 from escaping canister 10 through mouth 22 where floating lid 36 contacts filler neck 14. Gasket 42 may be made from a thermoplastic elastomer rubber, silicon, or any other suitable material. In the illustrative embodiment, gasket 42 is a continuous layer. Gasket 42 is coupled to a portion of inner surface 96 of disk 40, adjacent perimeter edge 92 of disk 40, and inner liner 41. In an embodiment, floating lid 36 has a maximum ovality less than about 0.015 inches.

A lid-manufacturing process 500 in accordance with the present disclosure is shown, for example, in FIG. 9. Lid-manufacturing process 500 includes several steps and begins a forming step 502 in which a polypropylene disk is formed. The polypropylene disk may be formed as suggested in FIGS. 10A and 10B by compression molding or by injection molding. Lid-manufacturing process 500 then proceeds to an inserting step 504 in which a molten gob of barrier material is inserted into a mold cavity on the polypropylene disk. Lid-manufacturing process 500 then proceeds to a compression molding step 506 in which the molten gob of barrier material is compression molded into the inner liner as suggested in FIGS. 11A and 11B. Lid-manufacturing process 500 then proceeds to an inserting step 508 in which a gob of elastomeric material is inserted into a mold cavity on the inner liner as shown in FIG. 12A. Lid-manufacturing process 500 then finishes with a compression molding step 510 in which the gob of elastomeric material is compression molded to establish the gasket as shown in FIG. 12B.

The manufacture of floating lid 36 is suggested in FIGS. 10A-12B. Disk 40 is formed through either compression molding or injection molding. Molten pellet or gob of EVOH 411 is inserted on roughly the center of inner surface 96 of disk 40. Gob of EVOH 411 is compression molded to form inner liner 41. A molten pellet or gob of elastomeric material 421 is inserted on roughly the center of inner liner 41. Gob of elastomeric material 421 is compression molded to form gasket 42, also called outer-liner 42.

In an illustrative embodiment, disk 40 is manufactured by compression molding. As shown in FIG. 10A, a disk compression mold 400, also called first compression mold 400, includes a lower disk mold plate 402 and an upper disk mold plate 404. Lower disk mold plate 402 and upper disk mold plate 404 cooperate to define an interior region or mold cavity 406 therebetween.

A pellet or gob of molten polypropylene 401 at temperature is inserted into mold cavity 406 on roughly the center of lower disk mold plate 402. Upper disk mold plate 404 is supported to move downwardly in direction 409 to within a predetermined distance of lower disk mold plate 402 as suggested, for example, in FIG. 10B to compress gob of molten polypropylene 401 placed in mold cavity 406 to produce disk 40 having a desired shape and thickness. In another example, the lower disk mold plate 402 or both disk mold plates 402, 404 may be moved to locate the disk mold plates 402, 404 at the predetermined distance as suggested, for example, in FIG. 10B.

Disk compression mold 400 maintains the relative position of lower disk mold plate 402 and upper disk mold plate 404 for a predetermined time $T_{P1}$ in the position shown in FIG. 10B. Next, disk compression mold 400 re-opens and disk 40 is allowed to cool for time $T_{P2}$ before disk 40 is ready for the next stage of the manufacture of floating lid 36. In another embodiment, disk 40 is produced by injection molding. After the injection molding, disk 40 is ready for the next stage of the manufacture of floating lid 36.

Inner liner 41 is manufactured, for example, by compression molding. Inner liner 41 comprises a barrier material. In one example, the barrier material is EVOH material or any other suitable alternative or combination. As shown in FIG. 11A, an inner liner compression mold 410, also called second compression mold 410, includes a lower inner liner mold plate 412 and an upper inner liner mold plate 414. Lower inner liner mold plate 412 and upper inner liner mold plate 414 cooperate to define an interior region or mold cavity 416 therebetween. Inner liner compression mold 410 may further include an outer sleeve 418.

Disk 40 is placed on lower inner liner mold plate 412 as suggested in FIG. 11A. Next, pellet or gob of molten EVOH 411 at temperature is inserted into mold cavity 416 on roughly the center of inner surface 96 of disk 40. Outer sleeve 418 may optionally engage inner surface 96 of disk 40 as suggested by FIG. 11A and limit the diameter of inner liner 41. Upper inner liner mold plate 414 is supported to move downwardly in direction 419 to within a predetermined distance of lower inner liner mold plate 412 as suggested, for example, in FIG. 11B to compress gob of molten EVOH 411 placed in mold cavity 416 to produce inner liner 41 having a desired shape and thickness and coupled to inner surface 96 of disk 40. In another example, the lower inner liner mold plate 412 or both inner liner mold plates 412, 414 may be moved as suggested, for example, in FIG. 11B. In another embodiment, an inner liner compression mold does not include an outer sleeve to limit the diameter of an inner liner to less than the diameter of inner surface 96 of disk 40. In such embodiment, an upper-liner mold plate is wider and engages inner perimeter edge 93 of disk 40.

Inner liner compression mold 410 maintains the relative position of lower inner liner mold plate 412, upper inner liner mold plate 414, and optionally outer sleeve 418 as shown in FIG. 11B for a predetermined time $T_{I1}$. Next, inner liner compression mold 411 reopens and inner liner 41 is allowed to cool for time $T_{I2}$ before inner liner 41 coupled to disk 40 is ready for the next stage of the manufacture of floating lid 36.

In one example, gasket 42 is manufactured by compression molding. Gasket 42 may be made from a thermoplastic elastomer rubber, silicon, or any other suitable material. As shown in FIG. 12A, a gasket compression mold 420 includes a lower gasket mold plate 422 and an upper gasket plate 424. Lower gasket mold plate 422 and upper gasket mold plate 424 cooperate to define an interior region or mold cavity 426 therebetween.

Disk 40 and inner liner 41 is placed on lower gasket mold plate 422 as suggested by FIG. 12A. Next, pellet or gob of molten elastomeric material 421 at temperature is inserted into mold cavity 426 on roughly the center of inner liner 41. Upper gasket mold plate 424 is supported to move downwardly in direction 429 to within a predetermined distance of lower gasket mold plate 422 as suggested, for example, in FIG. 12B to compress gob of molten elastomeric material 421 placed in mold cavity 426 to produce gasket 42 having a desired shape and thickness and coupled to disk 40 and inner liner 41. In another example, the lower gasket mold plate 422 or both gasket mold plates 422, 424 may be moved as suggested, for example, in FIG. 12B.

Gasket compression mold 420 maintains the relative lower gasket mold plate 422 and upper gasket mold plate 424 for a predetermined time $T_{G1}$. Next, gasket compression mold 421 reopens and gasket 42 is allowed to cool for time $T_{G2}$ before floating lid 36 is presented.

In yet another example, lower disk mold plate 404, lower inner liner mold plate 412, and lower gasket mold plate 422 may be the same mold plate. In this example, lower disk mold plate is on a turn table which indexes under various material deposition heads and upper mold plates to perform lid-manufacturing process 500.

Floating lid 36 is configured to be trapped between lid-retainer ring 34 and filler neck 14 when closure 20 is mated with container 12, as shown in FIG. 20. Floating lid 36 is also constrained by pry ledge 162, annular side wall 54, top wall 52, and annular lid-carrier ring 192 when closure 20 is not mated with container 12 as shown in FIG. 4.

When closure 20 is mated with container 12, and closure 20 is rotated relative to container 12, container threads 28 and closure threads 30 cooperate to cause top wall 52 to move closer to brim 24. As top wall 52 moves closer to brim 24, floating lid 36 becomes trapped between top wall 52 and brim 24 closing mouth 22, causing gasket 42 to seal with brim 24 as suggested by FIGS. 16-17 and 20-21. An outer surface 114 of filler neck 14 may also be coupled to gasket 42 to form the seal with brim 24.

Closure 20 mates with container 12 to form canister 10. When closure 20 is mated with container 12 and closure 20 is twisted to trap floating lid 36 between lid-retainer ring 34 and filler neck 14, mouth 22 is closed and canister 10 is sealed such that product-storage region 18 is sealed off from the atmosphere. Products may be stored in product-storage region 18 prior to mating closure 20 with container 12 to seal products inside canister 10.

Canister 10 is configured to go through a sterilization process known as retort. During retort, canister 10 and any products received in product-storage region 18 are heated and pressurized, as suggested in FIGS. 6A-8B. Prior to retort, products are received in product-storage region 18 of canister 10 and closure 20 is mated with filler neck 14. Before retort, product-storage region 18 of canister 10 has a pre-retort temperature 130T, pressure 130P, and volume 130V as suggested below the enlarged perspective view of canister 10 in FIG. 6B. In the illustrative embodiment, pre-retort temperature 130T and pressure 130P are about equal to atmospheric temperature and pressure. Pre-retort volume 130V is defined by container 12 and closure 20.

During retort, a number of canisters 10 are placed on a tray and moved along a conveyor toward an oven 124, as shown in FIG. 6B. As canister 10 progresses along the conveyor, canister 10 is moved into a hot oven 124, as shown in FIG. 7B. Oven 124 applies heat 126 to canister 10 to increase the temperature of product-storage region 18 until it reaches a retort temperature 132T that is greater than pre-retort temperature 130T.

At temperature 130T, container 12 and closure 20 remain rigid. As the temperature of product-storage region 18 rises to retort temperature 132T, the pressure of product-storage region 18 increases from pressure 130P to retort pressure 132P that is greater than pre-retort pressure 130P, as suggested by the enlarged perspective view of canister 10 in FIG. 7B. The increased pressure applies an outward force 82F to container 12 and closure 20, including floating lid 36. Outward force 82F causes a center portion 36C of floating lid 36 to deform and move upwardly as shown in FIGS. 7A and 7B. Container 12 and closure 20 cooperate to minimize risk of canister 10 rupturing as outward force 82F is applied to canister 10.

Gasket 42 remains mated with brim 24 of filler neck 14 while canister 10 is in oven 124. As such, product-storage region 18 remains sealed off from the atmosphere along with any products received within product-storage region 18 of canister 10. The pressure of product-storage region 18 may surpass retort pressure 132P such that it breaks the seal between gasket 42 and brim 24, allowing some of the air, or other gasses, sealed inside canister 10 to escape until the pressure of product-receiving cavity is reduced to retort pressure 132P and the seal is reestablished. Once the seal is reestablished, less air, or other gasses, is stored within product-storage region 18. With less air or other gasses inside canister 10, the pressure inside canister 10 will be lower at a given temperature than before the loss. As the conveyor moves canister 10 out of oven 124, canister 10 cools to an ambient temperature.

Once cooled, product-storage region 18 has a post-retort temperature 134T, pressure 134P, and volume 134V, as suggested by the enlarged perspective view of canister 10 in FIG. 8B. Post-retort temperature 134T of product-storage region 18 is similar to pre-retort temperature 130T of product-storage region 18 because the ambient temperature outside of oven 124 is similar before and after oven 124. Post-retort pressure 134P of product-storage region is less than pre-retort pressure 130P product-storage region 18 due to air escaping canister 10 when canister 10 was heated in oven 124. The ambient pressure, close to pre-retort pressure 130P, is higher than post-retort pressure 134P. The pressure differential contemporaneously results in an inward force 84F that causes floating lid 36 to deform as shown in FIGS. 8A and 8B. The deformation causes post-retort volume 134V to be lower than pre-retort volume 130V.

The flexibility and deformation of floating lid 36 during retort reduces the difference between pre-retort pressure 130P and post-retort pressure 134P relative to the difference that would occur with a rigid floating lid. The flexibility and deformation of floating lid 36 increases retort volume 132V and decreases post-retort volume 134V. By increasing retort volume 132V, fewer gases exit canister 10 during retort and additional gases in canister 10 after retort results in higher post-retort pressure 134P. A lower post-retort volume 134V also increases post-retort pressure 134P, because the same gases are contained in a smaller volume. If a floating lid is rigid, the volume would remain relatively constant during retort. The flexibility and deformation of floating lid 36 thereby limits the vacuum force by reducing the difference between pre-retort pressure 130P and post-retort pressure 134P. Less force is required to unseal canister 10 because post-retort pressure 134P is closer to ambient pressure. A canister with a rigid floating lid would have a lower post-retort pressure, and more force would be required to unseal the canister.

In illustrative embodiments, a canister 10 includes a drainable closure 20 that permits fluid from on top of closure 20 to drain to an outside of a container 12 of canister 10. Fluid is drained through the top of closure 20 through top vents 79 into an interior region 56 of closure 20. The fluid drains through a helix angle of closure threads 30 of closure 20 and into lower vents 144 near the bottom of closure 20. Vents 144 are placed in shoulder 152 to allow fluid to drain and yet maintain a solid contact with a lower barrier ring 32 on neck 14 of container 12. Torque inhibitor 150 is configured to control the torque and subsequent compressive forces between the top of neck 14 and closure 20. Such forces may cause the top of a floating lid or disk 36 of closure 20 to break out of a lid-retainer ring 34 of closure 20.

Shoulder 152 is configured to engage with barrier ring 32 at the precise moment the closure disk reaches a sufficient compression force on the area of sealing between floating lid 36 and neck 14 of container 12. When closure 20 is removed from container 12, floating lid 36 will be broken away from neck 14 of container 12 by lid pry-off feature 160. A top end of threads 30 on closure 20 is configured to act as a pry-off tool to break a seal of floating disk 36 at one point on the circumference of neck 14 to cock disk 36 rather than lift it vertically. This prying motion during rotation of closure 20 will significantly reduce the torque forces required to unscrew and remove closure 20.

Containers with single piece closures that include a thermoplastic polyurethane elastomer sealant layer and closure threads made of polymeric materials may have removal torques of at least about 30 in-lbs to over 50 in-lbs. Users with poor hand strength may be unable to open and unseal those containers. The combined benefit of the lower pressure differential between sealed canister 10 and ambient pressure due to the flexibility of floating lid 36, lid pry-off feature 160, and torque inhibitor 150 reduce the torque required to open and unseal canister 10. In illustrative embodiments, canister 10 requires less than about 15 in-lbs of torque to open and unseal canister 10. In other embodiments, canister 10 requires less than about 50 in-lbs of torque to open and unseal canister 10. In some embodiments, canister 10 requires about 30 in-lbs of torque to open and unseal canister 10.

To unseal canister 10, torque applied by a user must overcome the vacuum force, also called the sealing force, created between the container 12 and the floating lid 36. Torque inhibitor 150 controls the torque and subsequent compressive forces between brim 24 of filler neck 14 and floating lid 36 when closure 20 is mounted on container 12. Torque inhibitor 150 thereby limits the sealing force. The flexibility and deformation of floating lid 36 increases retort volume 132V and decreases post-retort volume 134V. The flexibility and deformation of floating lid 36 thereby limits the vacuum force by reducing the difference between pre-retort pressure 130P and post-retort pressure 134P. Pry ledge 162 concentrates the force applied to floating lid 36 to one side thereof, making removal of the floating lid 36 easier than lifting the entire floating lid 36 at once. With less force holding floating lid 36 to container 12, and with the torque applied by the user concentrated on one side of floating lid 36, the torque required by the user is reduced.

The invention claimed is:

1. A canister comprising
   a container comprising plastics materials and including a body formed to include a product-storage region, a filler neck coupled to the body and formed to include an open mouth arranged to open into the product-storage region, and container threads coupled to the filler neck and arranged to extend radially outward therefrom,
   a closure comprising plastics materials and being configured to mate with the filler neck to close the open mouth to block access to the product-storage region and to separate from the filler neck to open the open mouth to allow access to the product-storage region in response to a closure-removal force being applied to the closure, the closure including a lid-retainer ring including a top wall, an annular side wall having a first end coupled to a bottom surface of the top wall and a second end extending from the bottom surface of the top wall toward the body of the container, and closure threads coupled to the annular side wall in an interior region of the lid-retainer ring and arranged to extend radially inward from the annular side wall toward the filler neck to engage with the container threads, and a floating lid trapped between the filler neck and the top wall, and
   force-limiting means for limiting the closure-removal force required to separate the closure from the container to less than about 15 in-lbs after the canister survives a high-temperature, high-pressure retort process so that access to sterilized products in the product-storage region is provided to users.

2. The canister of claim 1, wherein the closure includes a shoulder provided by the second end of the annular side wall and a barrier ring coupled to the filler neck and arranged to extend away from the filler neck toward the annular side wall to mate with the shoulder and engage the shoulder to block over-tightening of the lid-retainer ring when a predetermined sealing force is established between the floating lid and the filler neck so as to contribute to the closure-removal force being less than about 15 in-lbs.

3. The canister of claim 2, wherein the force-limiting means includes pressure-limiting means for limiting a vacuum formed in the product-storage region during the retort process so as to contribute to the closure-removal force being less than about 15 in-lbs.

4. The canister of claim 3, wherein the force-limiting means includes lid-removal means for pivoting the floating lid relative to the filler neck to overcome vacuum force in the product-storage region acting on the floating lid so as to contribute to the closure-removal force being less than about 15 in-lbs.

5. The canister of claim 4, wherein the force-limiting means including ring-removal means for severing a thread bond formed between the lid-retainer ring and the filler neck without causing the floating lid to move so as to contribute to the closure-removal force being less than about 15 in-lbs.

6. The canister of claim 1, wherein the force-limiting means includes pressure-limiting means for limiting a vacuum formed in the product-storage region during the retort process so as to contribute to the closure-removal force being less than about 15 in-lbs.

7. The canister of claim 6, wherein the floating lid is configured to bulge outwardly away from the container to increase a volume of the canister during the retort process and to bulge inwardly toward the container to decrease a volume of the canister after the retort process so that pressure in the product-storage region is reduced during the retort process and the vacuum in the product-storage region is reduced after the retort process so as to contribute to the closure-removal force being less than about 15 in-lbs.

8. The canister of claim 1, wherein the force-limiting means includes ring-removal means for severing a thread bond formed between the lid-retainer ring and the filler neck without causing the floating lid to move so as to contribute to the closure-removal force being less than about 15 in-lbs.

9. The canister of claim 1, wherein the force-limiting means includes lid-removal means for pivoting the floating lid relative to the filler neck to overcome vacuum force in the product-storage region acting on the floating lid and to sever a lid bond formed between the floating lid and the filler neck during the retort process so as to contribute to the closure-removal force being less than about 15 in-lbs.

10. The canister of claim 1, wherein the force-limiting means includes lid-removal means for pivoting the floating lid relative to the filler neck to overcome vacuum force in the product-storage region acting on the floating lid so as to contribute to the closure-removal force being less than about 15 in-lbs.

11. The canister of claim 10, wherein the lid-removal means includes a pry ledge coupled to the annular side wall and arranged to extend away from the annular side wall toward the filler neck.

* * * * *